United States Patent [19]

Kleinhen

[11] Patent Number: 5,171,125
[45] Date of Patent: Dec. 15, 1992

[54] SHEET MATERIAL HANDLING APPARATUS AND METHOD HAVING A PIVOTABLE HOPPER AND BOTTOM FEEDER

[75] Inventor: Stephen R. Kleinhen, Eaton, Ohio

[73] Assignee: AM International Incorporated, Chicago, Ill.

[21] Appl. No.: 720,887

[22] Filed: Jun. 25, 1991

Related U.S. Application Data

[63] Continuation-in-part of Ser. No. 566,616, Aug. 13, 1990, Pat. No. 5,069,598, which is a continuation-in-part of Ser. No. 261,394, Oct. 24, 1988, abandoned.

[51] Int. Cl.⁵ .............................................. B65H 3/00
[52] U.S. Cl. ................................ 414/795.8; 414/797.6; 271/9; 271/35; 271/157; 271/162; 271/166; 198/406
[58] Field of Search .............. 271/9, 35, 147, 157, 271/162, 165, 166, 3, 3.1, 158, 159; 414/795.8, 797.4, 797.6, 798; 198/406

[56] References Cited

U.S. PATENT DOCUMENTS

| | | | |
|---|---|---|---|
| 2,697,528 | 12/1954 | Bishop et al. | 414/797.6 X |
| 3,027,021 | 3/1962 | Kramer | 414/797.6 X |
| 3,409,150 | 11/1968 | Voss | 414/795.8 |
| 4,192,496 | 3/1980 | Baselice et al. | 271/165 X |
| 4,249,847 | 2/1981 | Tokuno | 414/795.8 X |
| 4,418,907 | 12/1983 | Schultz et al. | 271/157 |
| 4,478,327 | 10/1984 | Siniscal et al. | 414/795.8 X |
| 4,618,054 | 10/1986 | Muller | 271/157 X |
| 4,662,624 | 5/1987 | Focke | 271/157 |
| 4,907,941 | 3/1990 | Focke et al. | 271/157 X |
| 5,069,598 | 12/1991 | Kleinhen et al. | 414/790.4 X |

FOREIGN PATENT DOCUMENTS

| | | | |
|---|---|---|---|
| 1249769 | 9/1967 | Fed. Rep. of Germany | 271/158 |
| 554196 | 4/1977 | U.S.S.R. | 414/797.4 |
| 2223004 | 3/1990 | United Kingdom | 414/795.8 |

Primary Examiner—Robert P. Olszewski
Assistant Examiner—Boris Milef
Attorney, Agent, or Firm—Tarolli, Sundheim & Covell

[57] ABSTRACT

A sheet material handling apparatus includes a container handling assembly which is operable to sequentially position containers at an unloading station. An unloader assembly is operable to remove stacks of sheet material from containers at the unloading station. The unloader assembly includes a lift assembly which is operable to engage a stack of sheet material disposed in a container and to lift the stack of sheet material upwardly through an open lower end portion of an upright hopper. Once the stack of sheet material has been moved into the hopper, the hopper and the stack of sheet material are moved to a tilted orientation. As the hopper moves to the tilted orientation, the hopper moves the stack of sheet material along an upwardly inclined ramp into engagement with a sheet material feed assembly. The sheet material feed assembly sequentially feeds sheet material from the lower end portion of the tilted stack of sheet material.

104 Claims, 14 Drawing Sheets

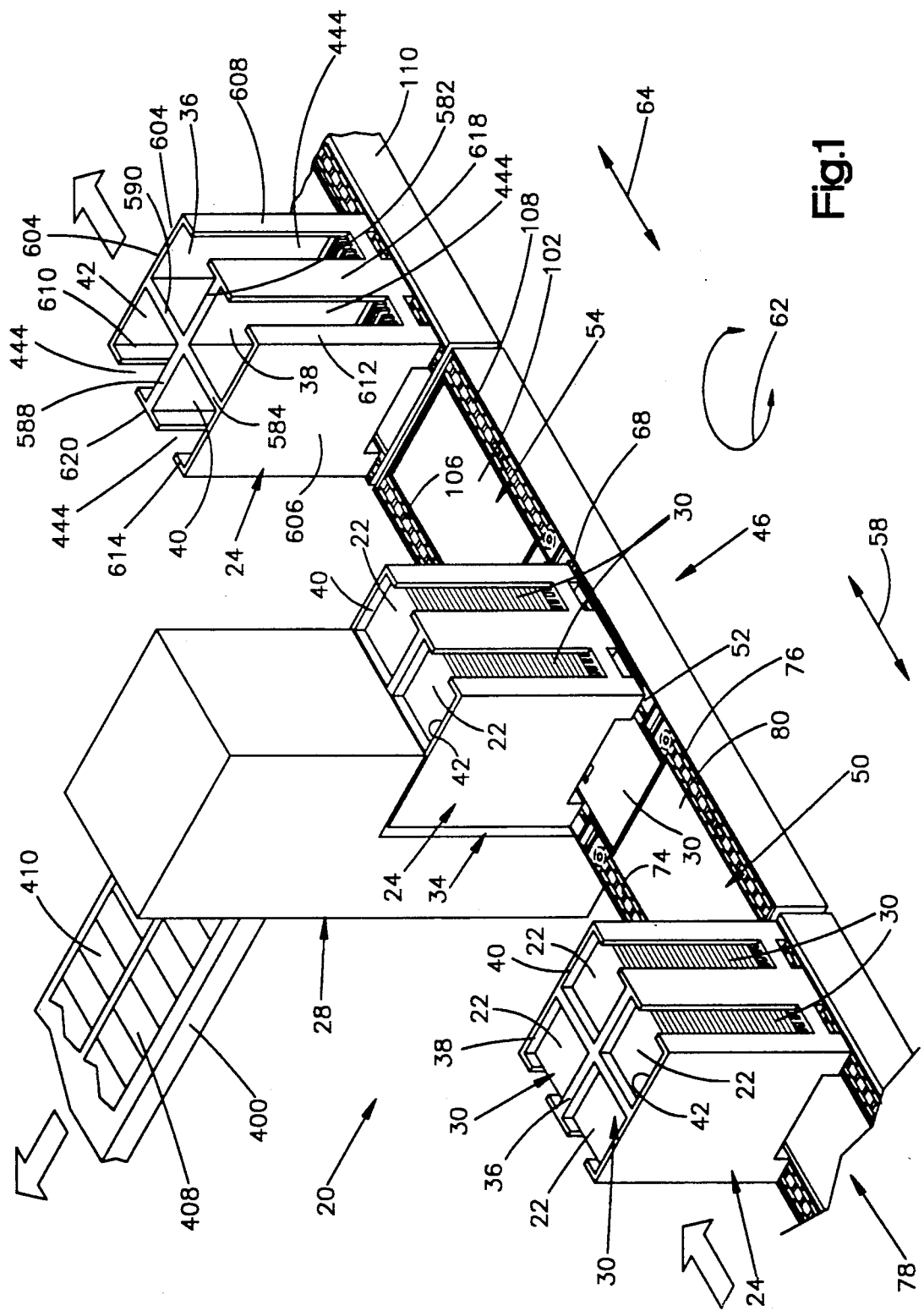

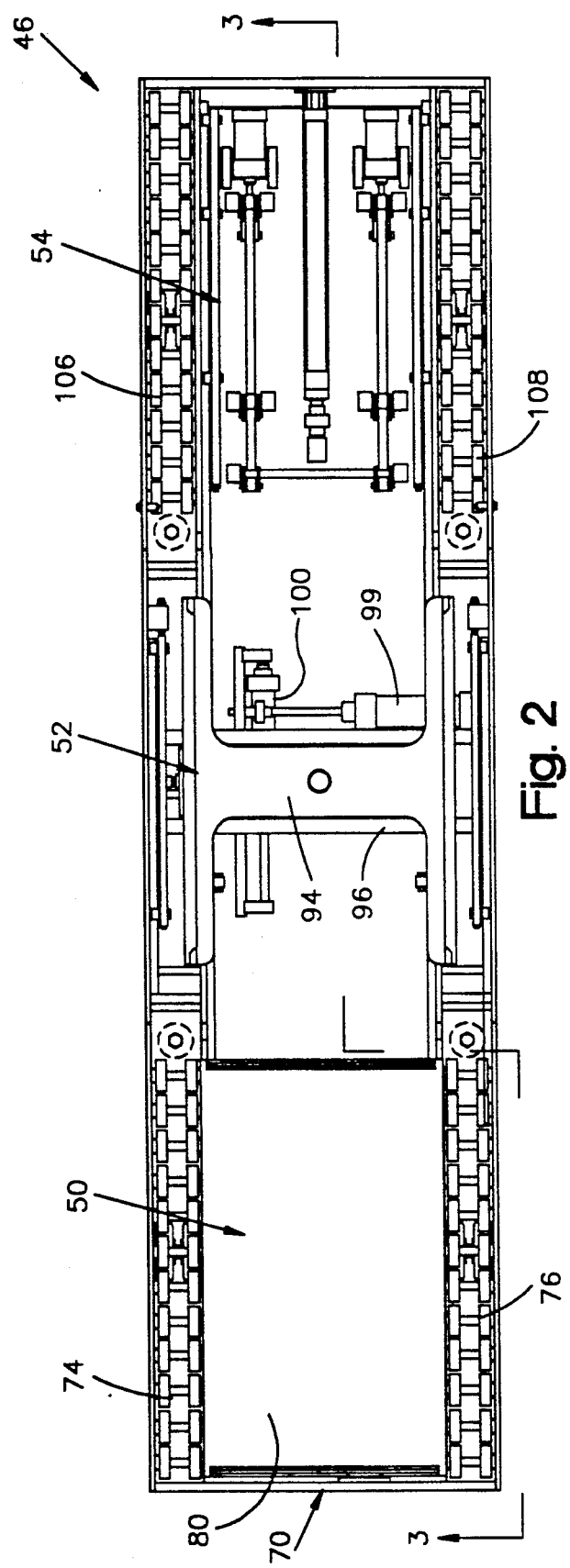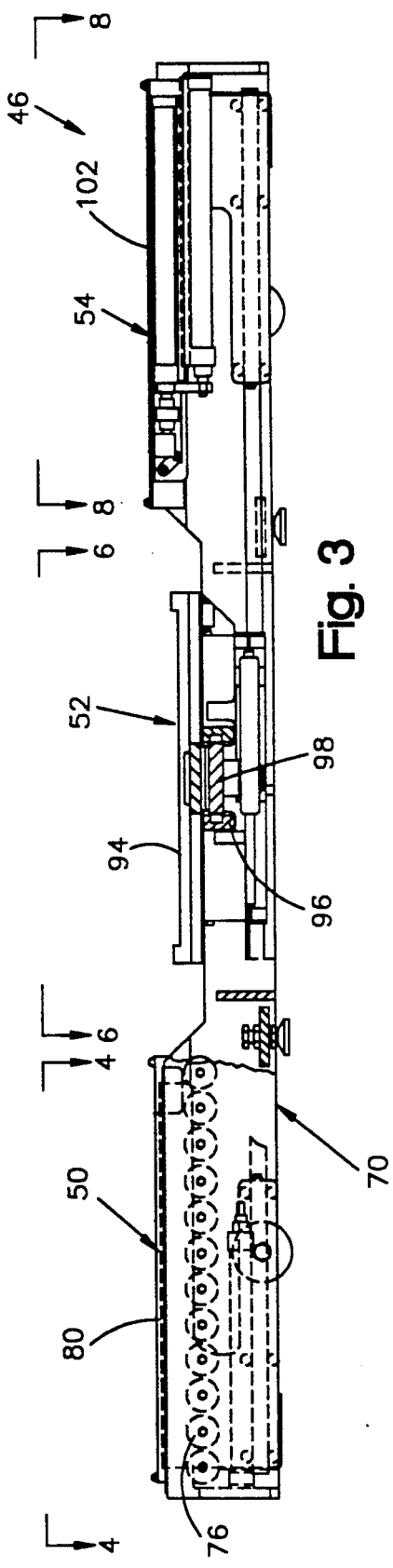

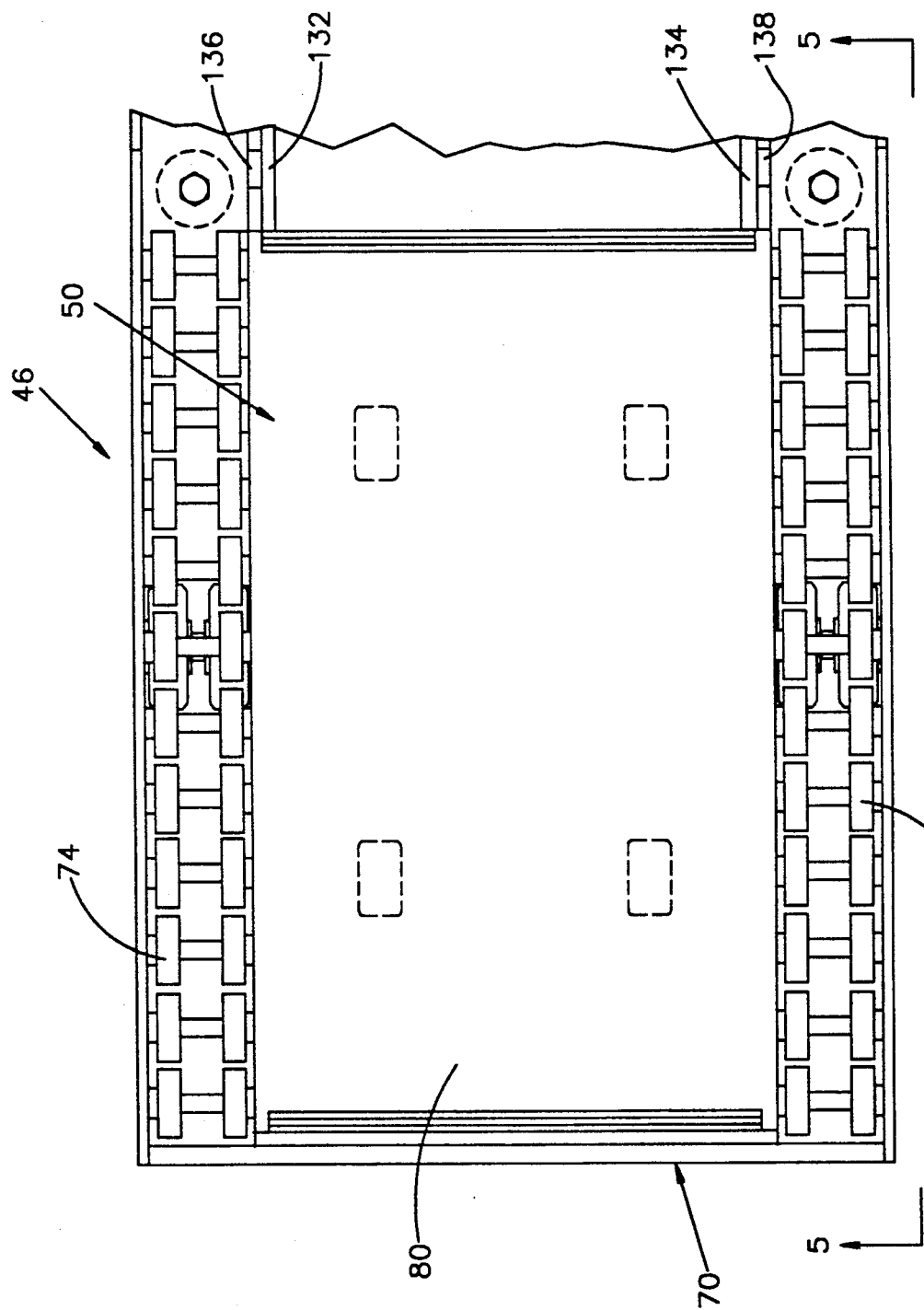

SHEET MATERIAL HANDLING APPARATUS AND METHOD HAVING A PIVOTABLE HOPPER AND BOTTOM FEEDER

RELATED APPLICATION

This application is a continuation-in-part of application Ser. No. 566,616 filed Aug. 13, 1990 by Robert A. Bryson and Stephen R. Kleinhen and entitled "Apparatus and Method for Loading Sheet Material Articles" now U.S. Pat. No. 5,069,598, which is itself a continuation-in-part of application Ser. No. 261,394 filed Oct. 24, 1988 by Robert A. Bryson and entitled "Signature Handling Apparatus" (now abandoned).

BACKGROUND OF THE INVENTION

The present invention relates to an apparatus and method for use in handling stacks of sheet material.

During the operation of a printing press, it may be advantageous to provide buffer storage for sections of a newspaper or magazine. When needed, the sections of a newspaper or magazine are moved out of storage and collated with other sections of the newspaper or magazine. An apparatus for providing buffer storage for newspaper sections is disclosed in U.S. Pat. No. 4,462,735.

This patent discloses the loading of newspaper sections into containers. The containers are stored on an endless conveyor. When a container is to be unloaded, it is moved to an unloading area and rotated about a vertical axis. The newspapers are then removed from the bottom of the container. As the newspapers are removed from the bottom of the container, the newspapers are moved away from the container in a stream. After the container has been unloaded, it is returned to the conveyor.

SUMMARY OF THE PRESENT INVENTION

The present invention provides a new and improved apparatus and method for use in handling stacks of sheet material. The apparatus may include a container handling assembly. The container handling assembly includes a first shuttle assembly which is operable to move a container having a plurality of compartments containing stacks of sheet material onto a carriage assembly adjacent to an unloader assembly. After the unloader assembly has removed stacks of sheet material from the container, the empty container is moved away from the carriage assembly by a second shuttle assembly. In order to position the compartments of the container relative to the unloader assembly, the carriage assembly may advantageously be operated to move the container toward and away from the unloader assembly and to rotate the container about a vertical axis.

An improved unloader assembly may be used with the container handling assembly. The unloader assembly includes a lift assembly which engages the lower end of a stack of sheet material in a compartment of a container and lifts the stack of sheet material upwardly through an open lower end portion of an upright hopper. When the stack of sheet material has been moved into the hopper by the lift assembly, the hopper and the stack of sheet material are moved from an upright orientation to a tilted orientation. As the hopper and stack of sheet material are tilted, a lower end portion of the stack of sheet material is moved along an upwardly inclined ramp into engagement with a sheet material feed assembly. The sheet material feed assembly is then operated to sequentially feed sheet material from the tilted stack.

BRIEF DESCRIPTION OF THE DRAWINGS

The foregoing and other features of the present invention will become more apparent upon a consideration of the following description taken in connection with the accompanying drawings, wherein:

FIG. 1 is a schematicized pictorial illustration of an apparatus constructed and operated in accordance with the present invention to sequentially unload stacks of sheet material from a plurality of compartments in each of a plurality of containers;

FIG. 2 is a top plan view of a container handling assembly used in the apparatus of FIG. 1 to sequentially position containers having compartments holding stacks of sheet material relative to an unloader assembly;

FIG. 3 is an elevational view, taken generally along the line 3—3 of FIG. 2, further illustrating the construction of the container handling assembly;

FIG. 4 is a plan view, taken generally along the line 4—4 of FIG. 3, illustrating the construction of an infeed shuttle assembly which engages a loaded container and moves the loaded container toward a carriage assembly;

DESCRIPTION OF ONE SPECIFIC PREFERRED EMBODIMENT OF THE INVENTION

General Description

Figure 5:
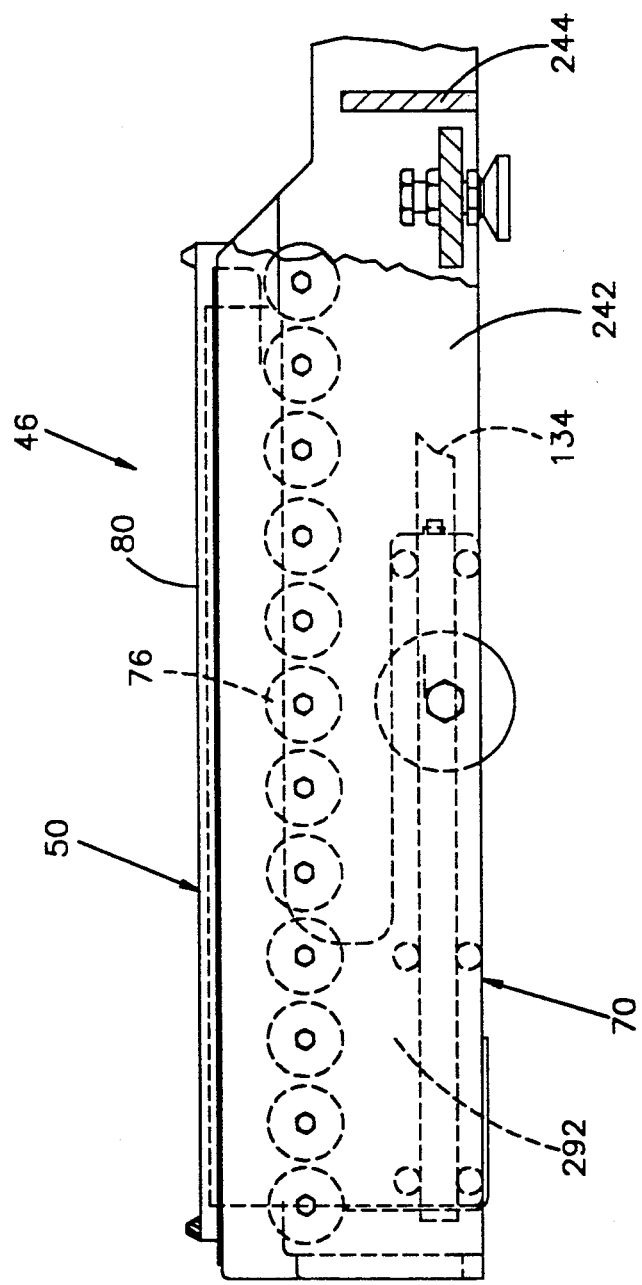
FIG. 5 is a side elevational view, taken generally along the line 5—5 of FIG. 4, further illustrating the construction of the infeed shuttle assembly.

A sheet material handling apparatus 20 (FIG. 1) is constructed and operated in accordance with the present invention. The apparatus 20 sequentially unloads sheet material articles or signatures 22 from containers 24. The sheet material handling apparatus 20 includes an improved unloader assembly 28. The unloader assembly 28 is operable to unload stacks 30 of sheet material 22 from compartments in a container 24 at an unloading station 34.

The sheet material handling apparatus 20 includes an improved container handling assembly 46. The container handling assembly 46 is operable to sequentially position the containers 24 at the unloading station or position 34 to enable the stacks 30 of signatures to be unloaded from the compartments. Each of the containers 24 includes a plurality of compartments disposed in a rectangular array. Thus, each of the containers includes rectangular compartments 36, 38, 40 and 42. The stacks 30 of signatures may be unloaded one stack-at-a-time or a plurality of stacks-at-a-time from the containers 24.

The container handling assembly 46 (FIGS. 1-3) includes a left or infeed shuttle assembly 50, a carriage assembly 52 and a right or outfeed shuttle assembly 54. The infeed shuttle assembly 50 reciprocates along a linear path, as indicated schematically by the arrow 58 in FIG. 1. Thus, infeed shuttle assembly 50 is operable from a retracted condition, shown in FIGS. 1-3, to an extended condition disposed in overlapping relationship with the carriage assembly 52 at an index station or position 68.

Operation of the infeed shuttle assembly 50 from the retracted condition to the extended condition moves a loaded container 24 to the index station or position 68 adjacent to and in front of the unloader assembly 28. The infeed shuttle assembly 50 is then operable to transfer the loaded container 24 to the carriage assembly 52. Once the loaded container has been transferred to the carriage assembly 52, the infeed shuttle assembly 50 is returned to the retracted condition. The carriage assembly 52 then moves the container toward the unloader assembly 28 to the unloading station 34.

After the container 24 has been partially emptied by operation of the unloader assembly 28, the carriage assembly 52 is operable to move the container away from the unloader assembly back to the index station 68. The carriage assembly 52 is then operated to rotate the container 24 about a vertical axis, in the manner indicated schematically by the arrow 62 in FIG. 1. Rotation of the container 24 about a vertical axis moves the empty compartments 36 and 38 away from the unloader assembly 28 and moves the stack containing compartments 40 and 42 toward the unloader assembly.

By rotating the container 24 through 180° about its vertical central axis, the carriage assembly 52 is operable to position the compartments 36 and 38 or the compartments 40 and 42 toward the unloading station 34 to enable the unloader assembly 28 to unload the stacks 30 of signatures 22 from the compartments. Although it is preferred to use the unloader assembly 28 in association with containers 24 having four compartments 36, 38, 40, and 42 for holding stacks 30 of sheet material, the unloader assembly could be used in association with containers having any desired number of compartments. For example, the unloader assembly 28 could be used with containers having only a pair of compartments or a single compartment for holding stacks 30 of sheet material.

Once the container 28 has been rotated to position the stack containing compartments 40 and 42 toward the unloader assembly 28, the carriage assembly 52 moves the container back to the unloading station 34. After the stacks of sheet material have been removed from the compartments 40 and 42, the carriage assembly 52 moves the empty container 24 back to the index station 68. A second or outfeed shuttle assembly 54 reciprocates along the linear path, in the manner indicated schematically by the arrow 64 in FIG. 1, to move the empty container 24 from the carriage assembly 52 at the index station 68. The outfeed shuttle assembly 54 and infeed shuttle assembly 50 reciprocate along the same linear path. The carriage assembly 52 is movable transversely to the path of movement of the shuttle assemblies 50 and 54 to move the container 28 between the unloading station 34 and index station 68.

When an unloaded container 24 is to be transferred from the carriage assembly 52, the outfeed shuttle assembly 54 is operated from a retracted condition, shown in FIGS. 1-3, to an extended condition in which the outfeed shuttle assembly is disposed in an overlapping relationship with the carriage assembly 52 at the index station 68. The empty container 24 is transferred from the carriage assembly 52 to the outfeed shuttle assembly 54. The outfeed shuttle assembly 54 is then returned to the retracted condition. This moves the empty container 24 away from the unloading station 34.

The foregoing description has assumed that the containers 24 move from the left to the right, as viewed in FIG. 1. However, the container handling assembly 46 can be used to move containers from right to left if desired. Thus, the right shuttle assembly 54 could be used to move loaded containers to the carriage assembly 52 and the left shuttle assembly 50 could be used to move empty containers from the carriage assembly. This can be readily done because the shuttle assemblies 50 and 54 have the same construction and mode of operation. If desired, the unloader assembly 28 could be used in conjunction with a container handling assembly having a construction which is different than the construction of the container handling assembly 46.

The container handling assembly 46 includes a rectangular main frame 70 (FIG. 2) which encloses the shuttle assemblies 50 and 54 and carriage assembly 52. A pair of roller conveyor segments 74 and 76 are disposed within the main frame 70 (FIGS. 2 and 3) on opposite sides of the infeed shuttle assembly 50. A suitable conveyor assembly 78 (FIG. 1) sequentially moves loaded containers 24 onto the roller conveyor segments 74 and 76 to position the loaded containers over the infeed shuttle assembly 50. The infeed shuttle assembly 50 (FIGS. 4 and 5) includes a platform assembly 80 which can be raised to lift a loaded container 24 off of the roller conveyor segments 74 and 76. Once a loaded container 24 has been lifted off of the conveyor assembly 78 by the platform assembly 80, the loaded container is supported by the infeed shuttle assembly 50 and is free to move with the infeed shuttle assembly.

The infeed shuttle assembly 50 is operable from the retracted condition shown in FIGS. 2, 3 and 4 to an extended condition in which the platform assembly 80 is in an overlapping relationship with the carriage assembly 52. The overlapping relationship occurs between the infeed shuttle assembly 50 and carriage assembly 52 at the index station 68. At this time, the fully loaded container 24 is disposed at the index station 68 in front of the unloader assembly 28. Although the container 24 is disposed at the index station 68, a portion of the container extends into the unloading station 34. Thus, the unloading station 34 and index station 68 overlap to some extent.

When the carriage 52 and infeed shuttle assembly 50 have been moved into an overlapping relationship at the index station 68, the shuttle platform assembly 80 (FIGS. 4 and 5) is lowered to transfer an loaded container 24 from the infeed shuttle assembly 50 to the carriage assembly 52. Once the loaded container 24 has been transferred to the carriage assembly 52, the infeed shuttle assembly 50 is moved out of the overlapping relationship with the carriage assembly 52 and back t the retracted condition shown in FIG. 4.

The loaded container 24 (FIG. 1) is transferred to the carriage assembly 52 with the compartments 36 and 38 of the container closest to the unloader assembly 28. The carriage assembly 52 then moves the container 24 toward the unloader assembly 28 to the unloading station 34. The stacks 30 of signatures 22 are removed from the first compartments 36 and 38 while the first compartments are at the unloading station 34. The compartments 36 and 38 may be unloaded either sequentially or simultaneously by the unloader assembly 28. The carriage assembly 52 remains stationary at the unloading station 34 until both of the compartments 36 and 38 have been emptied.

Figure 6:
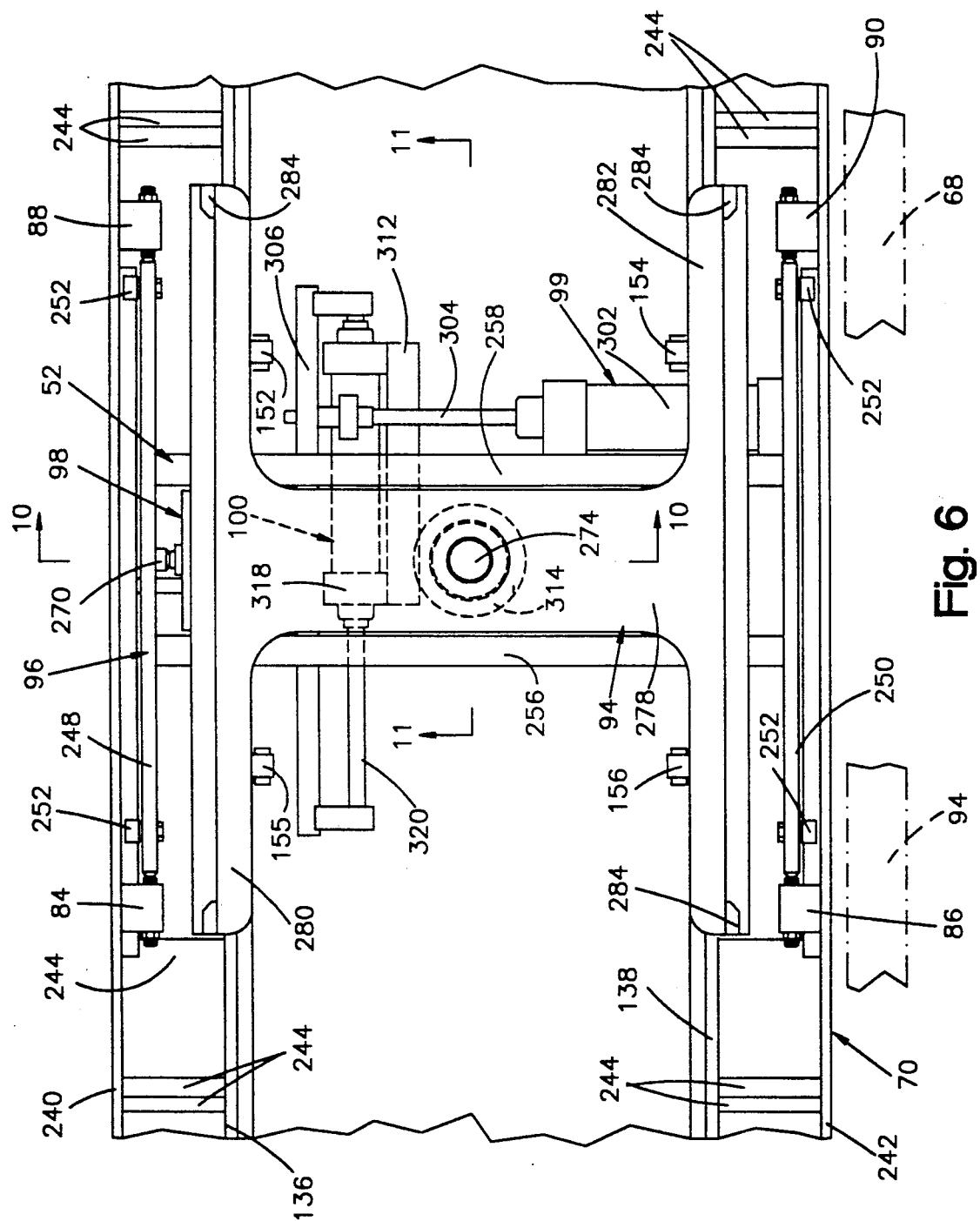
FIG. 6 is a plan view, taken generally along the line 6—6 of FIG. 3, illustrating the construction of the carriage assembly.

After the first two compartments 36 and 38 of the container 24 have been unloaded, the container 24 must be rotated to position the remaining two compartments, that is the compartments 40 and 42, adjacent to the unloader assembly 28. To rotate the container 24 about a vertical axis, a container support section or turntable 94 (FIGS. 2 and 3) of the carriage assembly 52 is rotated through 180° relative to a base or lower section 96 of the carriage assembly 52 (FIG. 6). Before the turntable or upper section 94 of the carriage assembly 52 can be rotated relative to the base or lower section 96 of the carriage assembly, the turntable must be moved away from the unloader assembly 28 back to the indexing station or position 68 (indicated in dash-dot lines in FIG. 6) to provide clearance between the turntable and the unloader assembly as the turntable rotates. Of course, the unloader assembly 28 could be constructed to provide the necessary clearance if desired.

Figure 7:
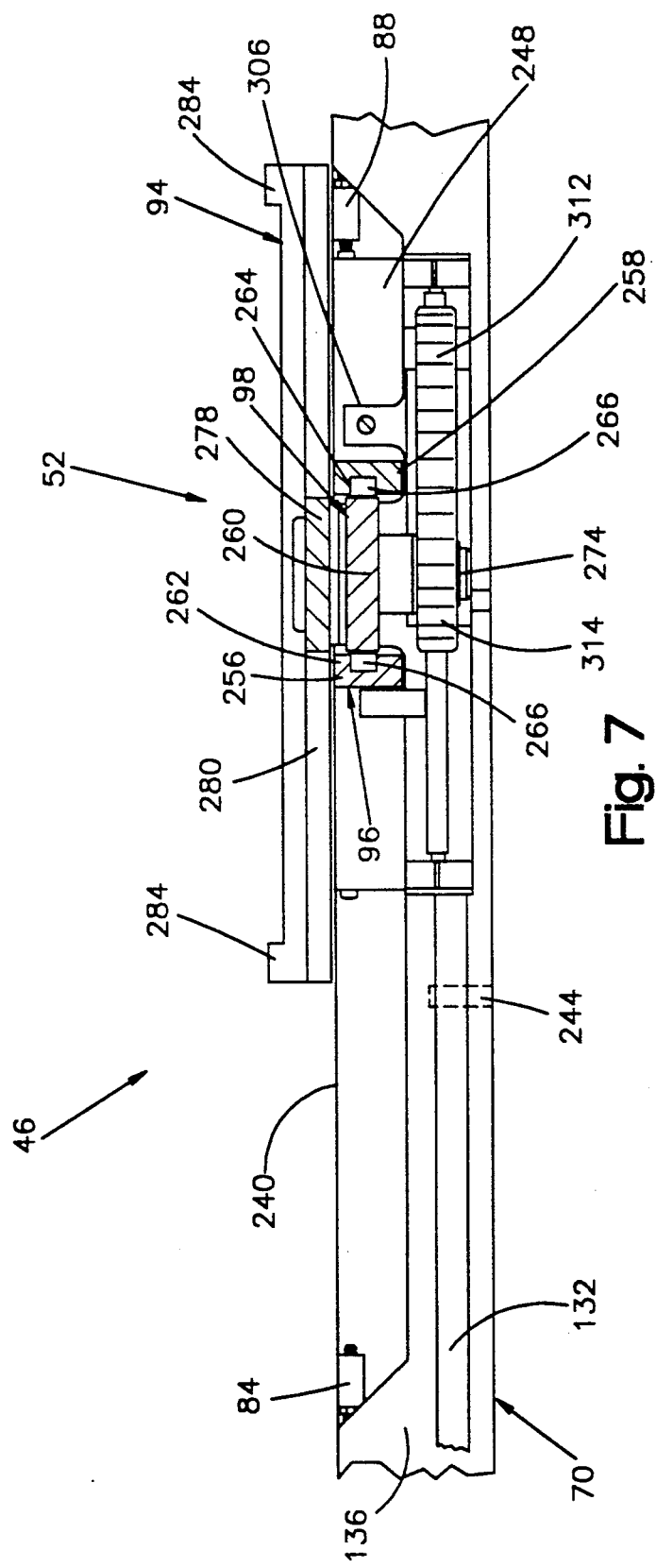
FIG. 7 is an elevational sectional view, taken generally along the line 7—7 of FIG. 6, further illustrating the construction of the carriage assembly.

To enable the turntable 94 to be moved toward and away from the unloader assembly 28 between the unloading position 34 and index position 68, the turntable is mounted on a cross slide or intermediate section 98 (FIGS. 6 and 7). The intermediate section 98 is movable by a motor 99 (FIGS. 2 and 6) along a path which is perpendicular to the path along which the shuttle assemblies 50 and 54 are reciprocated. By moving the intermediate section 98 outwardly, the turntable 94 is moved away from the unloader assembly 28. When the turntable 94 has been moved to the outward or indexing position 68, indicated in dash-dot lines in FIG. 6, the turntable 94 can be rotated through 180° about its vertical central axis by operation of a motor 100.

The 180° rotation of the turntable 94 moves the previously emptied compartments 36 and 38 away from the unloader assembly 28 and moves the loaded compartments 40 and 42 toward the unloader assembly 28. The intermediate section 98 of the carriage assembly 52 is then moved inwardly to the unloading position shown in solid lines in FIG. 6. This positions the stacks 30 in the compartments 40 and 42 of the container 24 adjacent to the unloader assembly 28 at the unloading position 34. If the unloader assembly 28 is constructed so as to provide the necessary clearance, the container 24 could be rotated at the unloading position 34.

The stacks 30 of signatures 22 are then removed from the second compartments 40 and 42 while the second compartments are at the unloading station or position 34. The compartments 40 and 42 may be unloaded either sequentially or simultaneously by the unloader assembly 28.

After the compartments 40 and 42 of the container 24 have been unloaded, the carriage assembly 52 moves the container 24 back to the index position 68. The right or outfeed shuttle assembly 54 is then extended. As the outfeed shuttle assembly 54 is extended, the carriage assembly 52 and shuttle assembly 54 move into an overlapping relationship relative to each other at the index station or position 68. When the outfeed shuttle assembly 54 is in the extended condition, a platform assembly 102 (FIG. 9) of the outfeed shuttle assembly 54 is disposed beneath the empty container 24 supported on the carriage assembly 52. It should be noted that the platform assembly 102 has been removed from the outfeed shuttle assembly 54 in FIGS. 2 and 8 in order to expose motors connected with the platform assembly.

After the compartments 40 and 42 of the container 24 has been unloaded, the platform assembly 102 (FIG. 9) on the outfeed shuttle assembly 54 is raised. Raising the platform assembly 102 lifts the empty container 24 off of the turntable 94 (FIGS. 6 and 7). The outfeed shuttle assembly 54 is then moved back to the retracted position shown in FIG. 9 to move the outfeed shuttle assembly 54 out of the overlapping relationship with the carriage assembly 52.

Figure 8:
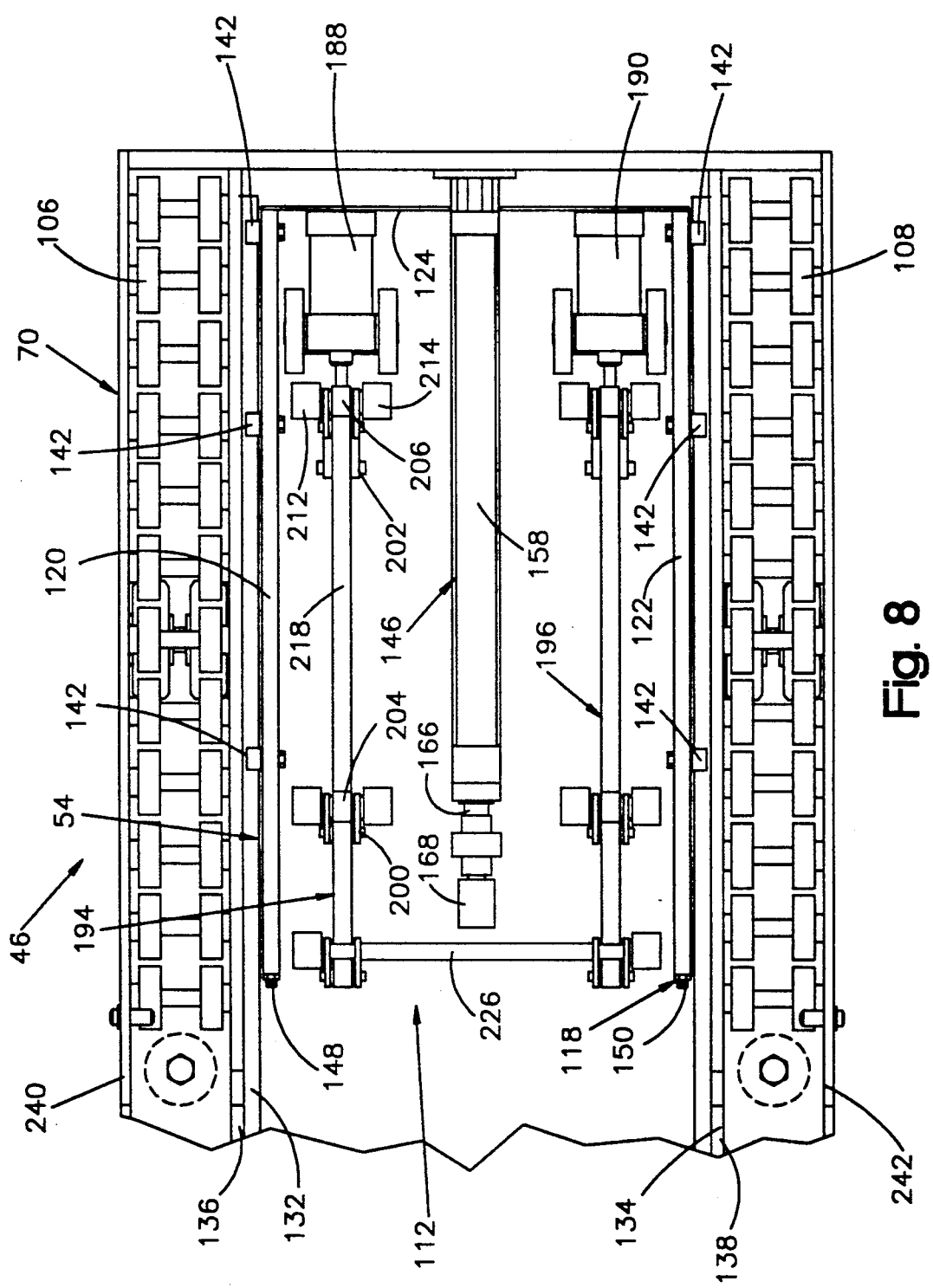
FIG. 8 is a plan view, taken generally along the line 8—8 of FIG. 3, illustrating the construction of an outfeed shuttle assembly, a platform assembly in the outfeed shuttle assembly having been removed in FIG. 8 to better illustrate the relationship between a shuttle drive motor and a pair of container support section lift motors.
Figure 9:
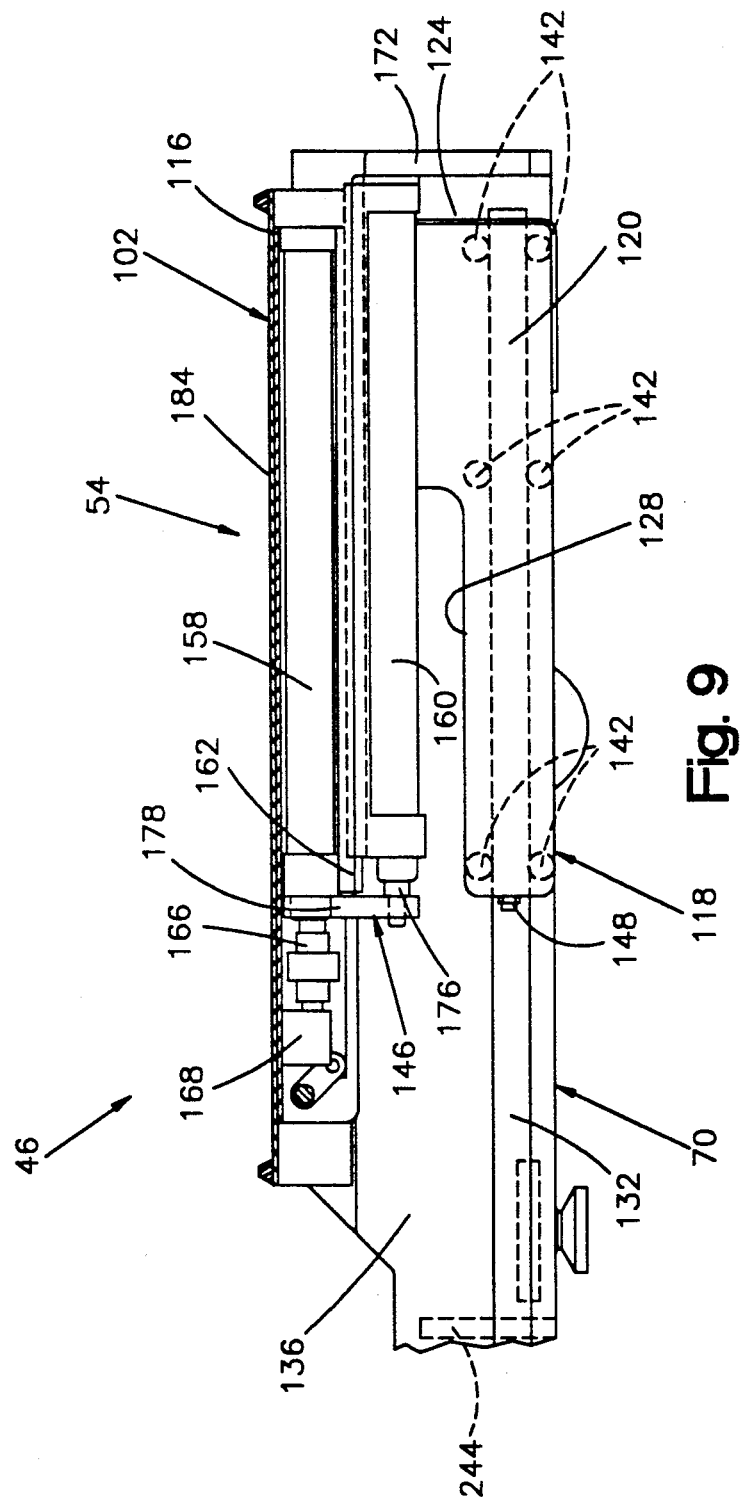
FIG. 9 is an elevational sectional view, taken generally along the line 9—9 of FIG. 8, with the platform assembly in place, illustrating the relationship between the shuttle drive motor assembly and the platform assembly.

When the outfeed shuttle assembly 54 has moved back to the retracted condition shown in FIG. 9, the empty container 24 is disposed over roller conveyor segments 106 and 108 (FIGS. 2 and 8). The platform assembly 102 (FIG. 9) of the outfeed shuttle assembly 54 is then lowered. This transfers the empty container 24 from the outfeed shuttle assembly 54 to the roller conveyor segments 106 and 108 (FIG. 8). The empty container 24 can be moved off of the roller conveyor segments 106 and 108 to a suitable conveyor assembly 110 (FIG. 1) and conveyed to a remote storage location.

The container handling assembly 46 has a construction and mode of operation which is substantially the same as is disclosed in co-pending application Ser. No. 566,616 filed Aug. 13, 1990 by Robert A. Bryson and Stephen R. Kleinhen and entitled "Apparatus and Method for Loading Sheet Material Articles". However, the carriage assembly 52 disclosed in that application can be reciprocated along the same path as the shuttle assemblies 50 and 54. In the material handling apparatus 46 disclosed herein the carriage assembly 52 cannot be reciprocated along the same path as the shuttle assemblies 50 and 54. Therefore, a motor and piston for reciprocating the carriage assembly 52 along the same path as the shuttle assemblies has been omitted from the embodiment of the container handling assembly 46 disclosed herein.

Shuttle Assemblies

The infeed and outfeed shuttle assemblies 50 and 54 have the same construction and mode of operation. The infeed shuttle assembly 50 is movable from the retracted condition shown in FIG. 1 to an extended condition in which it is disposed in an overlapping relationship with the carriage assembly 52 when the carriage assembly is at the index station or position 68. Similarly, the outfeed shuttle assembly 54 is movable from the retracted condition shown in FIG. 1 to a extended condition in which it is disposed in an overlapping relationship with the carriage assembly 52 when the carriage assembly is at the index station or position 68.

The outfeed shuttle assembly 54 includes a lift assembly 112 (FIG. 8) which is operable to move the platform assembly 102 (FIG. 9) between the lowered position shown in FIG. 9 and a raised position. The platform assembly 102 includes an inner or base section 116 (FIG. 9) which is fixedly connected with a generally U-shaped shuttle base section or frame 118 (FIG. 8). The shuttle base section or frame 118 includes a pair of parallel side plates 120 and 122 (FIG. 8) which are interconnected by an end plate 124. The side plates 120 and 122 are each provided with longitudinally extending slots 128 (FIG. 9) which receive the carriage assembly 52 when the outfeed shuttle assembly 54 and carriage assembly are in an overlapping relationship.

Movement of the shuttle assembly 54 between the retracted and extended conditions is guided by a pair of linear tracks 132 and 134 (FIGS. 8 and 9) which are fixedly connected with parallel inner side plates 136 and 138 of the main frame 70 (FIGS. 8 and 9). A plurality of rollers 142 connected with the side plates 120 and 122 engage opposite sides of the tracks 132 and 134 (FIG. 8). The tracks 132 and 134 also guide movement of the infeed shuttle assembly 50 between the extended and retracted positions. Therefore, the infeed shuttle assembly 50 and outfeed shuttle assembly 54 reciprocate along the same linear path relative to the main frame 70 of the container handling assembly 46.

The center of the index station or position 68 is disposed on the central axis of the path along which the infeed shuttle assembly 50 and outfeed shuttle assembly 54 reciprocate. The center of the unloading station or position 34 is offset toward the unloader assembly 28 from the central axis of the path along which the infeed shuttle assembly 50 and outfeed shuttle assembly 54 reciprocate.

A shuttle motor assembly 146 (FIGS. 8 and 9) is operable to move the base frame 118 of the outfeed shuttle assembly 54 from the retracted position shown in FIG. 8 to an extended position in which the shuttle assembly 54 is disposed in an overlapping relationship with the carriage assembly 52 at the index station 68. When the shuttle assembly 54 is in the extended position, stop bolts 148 and 150 on the ends of the side plates 120 and 122 (FIG. 8) are disposed in abutting engagement with shuttle assembly stops 152 and 154 (FIG. 6). Similarly, when the infeed shuttle assembly 50 is in the extended position, the base frame of the shuttle assembly engages the stops 155 and 156.

The shuttle motor assembly 146 (FIG. 9) includes an upper motor cylinder 158. The upper motor cylinder 158 is slidably mounted on a lower motor cylinder 160 by a guide track 162. The piston rod 166 of the upper motor cylinder 158 is fixedly connected to the platform assembly 102 (FIG. 9) by a block 168. The lower motor cylinder 160 is fixedly connected with an end plate 172 of the main frame 70 and extends parallel to the upper motor cylinder 158. The piston rod 176 of the lower motor cylinder 160 is connected with the upper motor cylinder 158 by a connector section 178.

Upon operation of the lower motor cylinder 160 from the retracted condition shown in FIG. 9 to the extended condition, the piston rod 176 is extended toward the left. Leftward (as viewed in FIG. 9) movement of the piston rod 176 moves the upper motor cylinder 158 and the platform assembly 102 toward the left. Operation of the upper motor cylinder 158 from the retracted condition shown in FIG. 9 to the extended condition moves the piston rod 166 toward the left. This moves the platform assembly 102 leftwardly relative to both the upper motor cylinder 158 and the lower motor cylinder 160. Therefore, the platform assembly 102 is moved leftwardly from a retracted position to an extended position through a distance which equals the combined operating strokes of the upper and lower motor cylinders 158 and 160.

As the motor cylinders 158 and 160 are extended, the base frame 118 of the platform assembly 54 moves leftwardly until the stops 148 and 150 (FIG. 8) on the leading ends of the base section 118 engage the shuttle assembly stops 152 and 154 (FIG. 6). When the outfeed shuttle assembly 54 is in the extended position, the outfeed shuttle assembly 54 and carriage 52 are in an overlapping relationship at the index station 68. At this time, the carriage assembly 52 extends through slots 128 (FIG. 9) in the opposite side plates 120 and 122 of the shuttle assembly base frame 118. Thus, the turntable 94, intermediate section 98 and base section 96 (FIG. 6) of the shuttle assembly 52 extend through the slots 128 in the side plate 120 of the shuttle base frame 118.

In the embodiment of the invention shown in FIGS. 4-9, the platform assembly 102 is disposed above the carriage assembly 52. However, it is contemplated that at least a portion of the carriage assembly 52 could be disposed above the platform assembly 102 when the carriage assembly and shuttle assembly 54 are in an overlapping relationship. Thus, if desired, the turntable 94 could be disposed above the platform assembly 102 when the carriage assembly 52 and shuttle assembly 54 are in an overlapping relationship. Of course, this would require clearance space, such as a slot in the platform assembly 102, in components of the shuttle assembly 54 for components of the carriage assembly 52.

The platform lift assembly 112 (FIG. 8) is operable to move an upper or container support section 184 of the platform assembly 102 upwardly relative to the base or inner support section 116 (FIG. 9). The platform lift assembly 112 includes a pair of lift motors 188 and 190 (FIG. 8). The lift motors 188 and 190 are fixedly connected with the inner or base section 116 (FIG. 9) of the platform assembly 102.

The lift motors 188 and 190 are operable to actuate toggle lift assemblies 194 and 196 (FIG. 8) raise the container support section 184 (FIGS. 10 and 11) of the platform assembly 102 relative to the base section 116 of the platform assembly. The toggle lift assembly 194 includes a pair of toggle arms 200 and 202 (FIG. 8). A pair of rollers 204 and 206 (FIG. 8) are mounted on upper end portions of the toggle arms 200 and 202. The toggle arms 200 and 202 are pivotally mounted on and movable with the base section 116 of the platform assembly 102 relative to the frame 70 upon operation of the shuttle assembly motor 146.

The toggle arm 202 is pivotally mounted on a support pin connected with the base section 116 by a pair of mounting brackets 212 and 214 (FIG. 8). An actuator bar 218 (FIG. 8) is pivotally connected to the lower end portions of the toggle arms 200 and 202.

When the toggle motor 188 is operated from the retracted condition shown in FIG. 8, the toggle actuator bar 218 is moved toward the left. Leftward movement of the toggle actuator bar 218 pivots the toggle arms 200 and 202. Pivoting the toggle arms 200 and 202 raises the rollers 204 and 206 through openings formed in the base section 116 of the platform assembly 102. Upward movement of the rollers 204 and 206 raises the container support section 184 (FIG. 9) of the platform assembly 102 upwardly relative to the base section.

Thus, the roller 206 moves upwardly through the opening formed in the base section 116 and engages the upper or container support section 184 of the platform assembly 122 during initial movement of the actuator bar 218. Continued movement of the actuator bar 218 causes the toggle arm 202 to continue to pivot about its support pin to lift the upper section 184 of the platform assembly 102 upwardly away from the lower or base section 116 of the platform assembly.

A guide block connected with the container support section 184 is engaged by a pair of guide blocks connected with the inner support section 116 to guide upward movement of the container support section relative to the base section 116 of the platform assembly 102. There are four guide blocks provided adjacent to the corners of the container support section 184. These four guide blocks cooperate with four pairs of guide blocks connected with the base section 116 adjacent to the corner portions of the base section.

When the toggle motor 188 is retracted, the actuator bar 218 is moved toward the right (as viewed in FIG. 8). This results in the toggle arm 222 pivoting to move the toggle arm 202 from the raised position to the lowered position. The toggle arm 200 is pivoted in the same manner as the toggle arm 202 when the toggle motor 188 is retracted. As the toggle arms 200 and 202 are pivoted downwardly, the upper or container support section 184 of the platform assembly 102 moves downwardly into abutting engagement with the base section 116 of the platform assembly.

Although operation of only the toggle linkage assembly 194 associated with the motor 188 has been described herein, it should be understood that a similar toggle linkage 196 is associated with the motor 190 (FIG. 8). A tie rod or bar 226 (FIG. 8) extends between the two toggle linkage arrangements and interconnects them. The toggle motors 188 and 190 are simultaneously actuated to operate the toggle linkages 194 and 196 at the same time.

Although only the construction of the right or outfeed shuttle assembly 54 has been described in detail herein, it should be understood that the left or infeed shuttle assembly 50 (FIGS. 2 and 4) has the same construction and operates in the same manner as the outfeed shuttle assembly. Thus, the infeed shuttle assembly 50 includes a motor having the same construction as the shuttle motor 146. This motor is operable to move the infeed shuttle assembly 50 between the retracted position shown in FIGS. 1 and 2 and an extended position in which the infeed shuttle assembly is in an overlapping relationship with the carriage assembly 52 at the index station 68.

The infeed shuttle assembly 50 also includes a lift assembly having the same construction as the lift assembly 112. The lift assembly in the infeed shuttle assembly 50 is operable to move an upper container support section of the platform assembly 80 relative to an inner or base section of the platform assembly 80. This is done in the same manner as in which the container support section 184 of the platform assembly 102 is moved relative to the base or inner section 116 of the platform assembly. Since the shuttle assemblies 50 and 54 have the same construction and mode of operation, either shuttle assembly can be used as the infeed shuttle assembly while the other shuttle assembly is used as the outfeed shuttle assembly. If desired, the construction of the shuttle assemblies 50 and 54 could be different than the construction described herein.

Carriage Assembly

The carriage assembly 52 is operable to move a container 24 along a linear path and to rotate the container about a vertical axis which extends through the center of the container. The carriage assembly 52 (FIG. 6) includes the stationary base section 96 the intermediate section 98 which is movable along a linear path, and the turntable 94 which is rotatably mounted on the intermediate section 98 (FIG. 7). The base section 96 is stationary and is connected with the main frame 70. The inner side plates 136 and 138 are connected in a parallel relationship with the outer side plates 240 and 242 by spreader plates 244.

The stationary base section 96 of the carriage assembly 52 includes a pair of parallel end plates 248 and 250. A pair of parallel cross plates 256 and 258 (FIGS. 6 and 7) extend perpendicular to and interconnect the side plates 248 and 250. The cross plates 256 and 258 support the intermediate section 98 (FIGS. 6 and 7) for movement along a linear path extending perpendicular to the side plates 248 and 250.

The intermediate section 98 has a rectangular body portion 260 (FIG. 7). The body portion 260 of the intermediate section 98 is supported for movement along tracks 262 and 264 (FIG. 7) formed in the cross plates 256 and 258 of the base section 96 by rollers 266. A stop 270 (FIG. 6) connected to the side plate 248 limits movement of the intermediate section 98 toward the side plate 248 when the turntable 94 has moved to the unloading position 34. Similarly, a second stop (not shown) limits movement of the intermediate section 98 toward the side plate 250 when the turntable 94 has moved to the index position 68 shown in dash-dot lines in FIG. 6. Thus, movement of the intermediate section 98 in a direction perpendicular to the outer side plates 240 and 242 of the main frame 70 is effective to move the turntable 94 from an inner or unloading position (shown in solid lines in FIG. 6) to an outer or indexing position (shown in dash-dot lines in FIG. 6) to provide space for the turntable 94 to rotate about its vertical central axis.

The turntable 94 is rotatably supported on the intermediate section 98 by a cylindrical post 274 (FIGS. 6 and 7). The turntable 94 has a generally H-shaped configuration (FIG. 6) with the support post 274 extending through a center cross section 278 of the turntable 94. A pair of elongated parallel support sections 280 and 282 extend perpendicular to and are fixedly connected with the center cross section 278. Container positioning pads 284 are disposed at the four corners of the turntable 94 to engage recesses in the containers 24 to position the containers relative t the turntable.

A loaded container 24 (FIG. 1) holding four stacks 30 of sheet material is initially placed on the carriage assembly 52 by the infeed shuttle assembly 50. At this time, the loaded container is disposed at the index station 68. The intermediate section motor 99 is then extended to move the intermediate section 98 toward the unloader assembly 28. This moves the container 24 from the index position to the unloading position with the compartments 36 and 38 closest to the unloader assembly 28.

After the stacks 30 of sheet material have been removed from the compartments 36 and 38 of the container 24 by the unloader assembly 28, the container 24 is moved back to the index station 68 and rotated about its vertical central axis. This is accomplished by rotating the turntable or container support section 94 of the carriage assembly 52 about the vertical central axis of the post 274.

Before the turntable 94 can be rotated, the intermediate section 98 of the carriage assembly 52 is moved away from the loader assembly 28 to the indexing position 68 to provide room for the turntable 94 to rotate. This is accomplished by retracting the intermediate section motor 99 (FIG. 6) to move the intermediate section 98 relative to the base section 96 of the carriage assembly 52. The intermediate section motor 99 includes a cylinder 302 which is fixedly connected to the side plate 250 of the carriage base section 96. A piston rod 304 of the intermediate section motor 99 is fixedly connected to a support plate 306 (FIG. 6) which is secured to the intermediate section 98.

Since the intermediate section motor 99 is connected with the intermediate section 98 and the base section 96, operation of the intermediate section motor moves the intermediate section 98 relative to the base section. Thus, when the intermediate section motor 99 is operated from the extended condition shown in FIG. 6 to a retracted condition, the piston rod 304 pulls the intermediate section 98 toward the side plate 250 of the base section 96. This moves the turntable 94 from the unloading position shown in solid lines shown in FIG. 6 to the index position shown in dashed-dot lines.

Once the turntable section 94 has been moved outwardly away from the unloader assembly 28 to the index position shown in dash-dot lines in FIG. 6, the turntable motor 100 is operated to move a rack gear 312 to rotate a pinion gear 314 (FIGS. 6, 7, 10 and 11). The turntable motor 310 includes a movable cylinder 318 (FIG. 6) which is fixedly connected with the rack gear 312. The cylinder 318 is movable relative to a piston rod 320 which is fixedly connected at opposite ends with the support plate 306.

Upon operation of the turntable motor 100, the cylinder 318 moves leftwardly from the position shown in FIG. 6 to a position adjacent to the opposite end of the piston rod 320. This movement of the cylinder 318 and rack gear 312 rotates the pinion gear 314 and turntable 94 in a counterclockwise direction (as viewed in FIG. 6). Upon operation of the turntable motor 100 in the opposite direction, the rack gear 312 is moved from left to right (as viewed in FIG. 6) to rotate the pinion gear 314 and turntable 94 in a clockwise direction. Each time the motor cylinder 318 and rack gear 312 move through an operating stroke the pinion gear 314 and turntable 94 are rotated through 180° about a vertical axis extending through the center of the post 274 and a container disposed on the turntable 94.

In the illustrated embodiment of the invention, the turntable motor 100 is of the type in which a cylinder moves relative to a piston and piston rod during operation of the motor. If desired, the motor could be constructed so as to have the rack gear 312 connected with a piston rod which moves relative to a cylinder. In fact, it is contemplated that a pair of motors could be connected with the rack gear 312. If this was done, both of the motors would be operated simultaneously to effect rotation of the pinion gear 314.

The construction of the container handling assembly 46 may be different than the specific construction described herein. For example, devices other than the shuttle assemblies 50 and 54 could be used to move the containers 24 onto and off of the carriage assembly 52. The construction of the carriage assembly 52 could be modified to rotate the container 24 without moving the container from the unloading station 34 to the index station 68. The carriage assembly 52 could be constructed so as to overlap the shuttle assemblies 50 and 54 when they are extended. The foregoing example of a container handling assembly construction should be considered as being exemplary of many container handling assembly constructions which may be used with the unloader assembly 28.

Unloader Assembly

The unloader assembly 28 (FIGS. 10-13) removes stacks 30 (FIGS. 1 and 10) of sheet material from each of the containers 24 in turn The unloader assembly 28 feeds the sheet material from the stacks 30 to a discharge conveyor 400 (FIG. 1). The discharge conveyor 400 moves the sheet material to a location where the sheet material is used, such as to a newspaper assembling machine. Although it is preferred to use the unloader assembly 28 in association with the containers 24 and container handling assembly 46, the unloader assembly could be supplied with stacks o sheet material by other apparatus.

The unloader assembly 28 includes a pair of unloader units 404 and 406 (FIGS. 11 and 12) which are disposed in a side-by-side relationship. The two unloader units 404 and 406 have the same construction and mode of operation. The two unloader units 404 and 406 can be operated to simultaneously remove two stacks 30 of sheet material from a container 24. Alternatively, the unloader units 404 and 406 can be operated to sequentially remove stacks 30 of sheet material from a container 24. Of course, the unloader assembly 28 could be constructed with only a single unloader unit 404 or 406.

When the unloader units 404 and 406 are operated to unload stacks from two container compartments at a time, that is from the compartments 36 and 38 or 40 and 42, two streams 408 and 410 (FIG. 1) of sheet material are conducted from the unloader assembly 28 by the conveyor 400. When the unloader assembly 28 is operated to sequentially unload stacks of sheet material from the compartments 36 through 42, two streams of sheet material, with large interruptions in the streams, are transported from the unloader assembly 28 by the conveyor 400. These two streams with large interruptions may be combined to form a single stream if desired.

It is contemplated that the unloading operation will be expedited if the unloader units 404 and 406 are operated to simultaneously remove two stacks 30 of sheet material from a pair of container compartments at a time. However, when it is not necessary to maximize the speed with which the unloading operation is performed, the unloader units 404 and 406 may be operated to remove the stacks 30 of sheet material from one of the container compartments 36–42 at a time.

Although it is preferred to construct the unloader assembly 28 with a pair of unloader units 404 and 406, the unloader assembly 28 could be constructed with only a single unloader unit. If this were done, the carriage assembly 52 would be constructed to reciprocate a container 24 along the same path as the infeed shuttle assembly 50 and outfeed shuttle assembly 54 to position the container for sequential unloading of the compartments 36 and 38 or 40 and 42. Thus, the carriage assembly 52 could include a motor to reciprocate the base section 96 in the same manner as is disclosed in co-pending application Ser. No. 566,616 filed Aug. 13, 1990 by Robert A. Bryson and Stephen R. Kleinhen and entitled "Apparatus and Method for Loading Sheet Material Articles". Of course, the carriage assembly 52 could have a different construction if desired.

The unloader unit 404 of the unloader assembly 28 includes a stack transfer or lift assembly 414 (FIG. 10) which is operable to lift a stack 30 of sheet material upwardly through an open upper end portion 416 of the container compartment 38. The stack transfer or lift assembly 414 is operable to move the stack 30 of sheet material straight upwardly along a vertical path. Although it is preferred to supply the stacks 30 of sheet material to the stack transfer or lift assembly in the containers 24, the stacks of sheet material could be supplied to the stack transfer assembly in a different manner if desired.

An open-ended hopper 418 (FIG. 10) receives the stack 30 of sheet material as the stack is moved upwardly by the stack transfer assembly 414. Thus, the stack transfer assembly 414 moves the stack 30 of sheet material vertically upwardly through the open lower end portion 420 of the hopper 418. At this time, the hopper 418 is in the upright orientation shown in FIG. 10. When the hopper 418 is in the upright orientation, a vertical axis 422 is coincident with vertical central axes of the hopper 418, container compartment 38, and stack 30 of sheet material in the container compartment.

Figure 12:
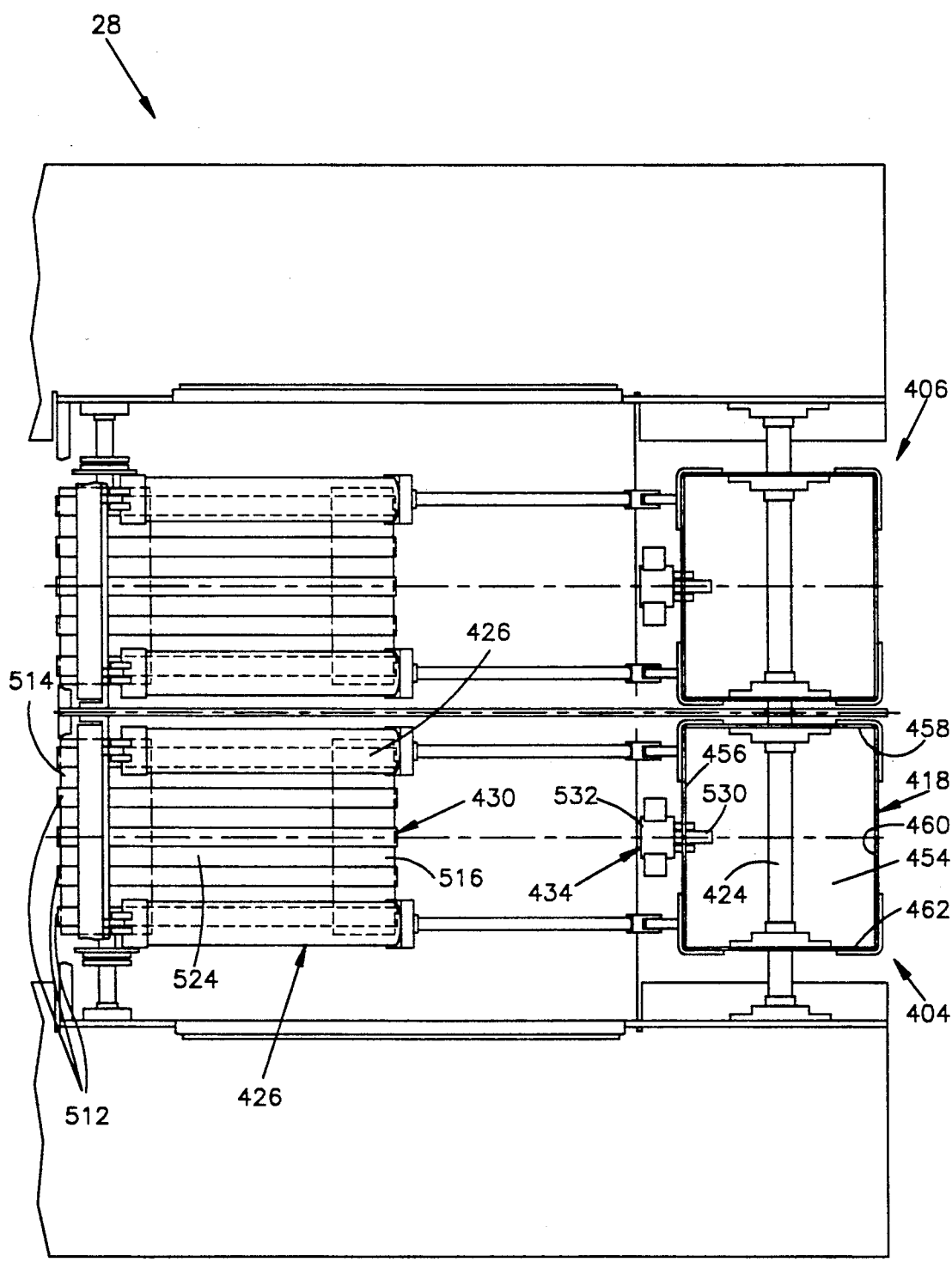
FIG. 12 is a sectional view, taken generally along the line 12—12 of FIG. 10, illustrating the relationship between an open-ended hopper and motors for moving the hopper between the upright orientation and a tilted orientation.

After the stack 30 of sheet material has been moved into the upright hopper 418, the hopper and the stack of sheet material are pivoted about the horizontal central axis of a hopper support shaft 424 by operation of a plurality of hopper motors 426 (FIG. 12). Pivoting movement of the hopper 418 about the support shaft 424 moves the hopper and the stack 30 of sheet material in the hopper, from the upright orientation of FIG. 10 to the tilted orientation of FIG. 13. When the hopper 418 is in the tilted orientation of FIG. 13, a central axis 428 of the hopper and the stack 30 of sheet material in the hopper, intersects and is skewed at an acute angle to the vertical axis 428.

Figure 10:
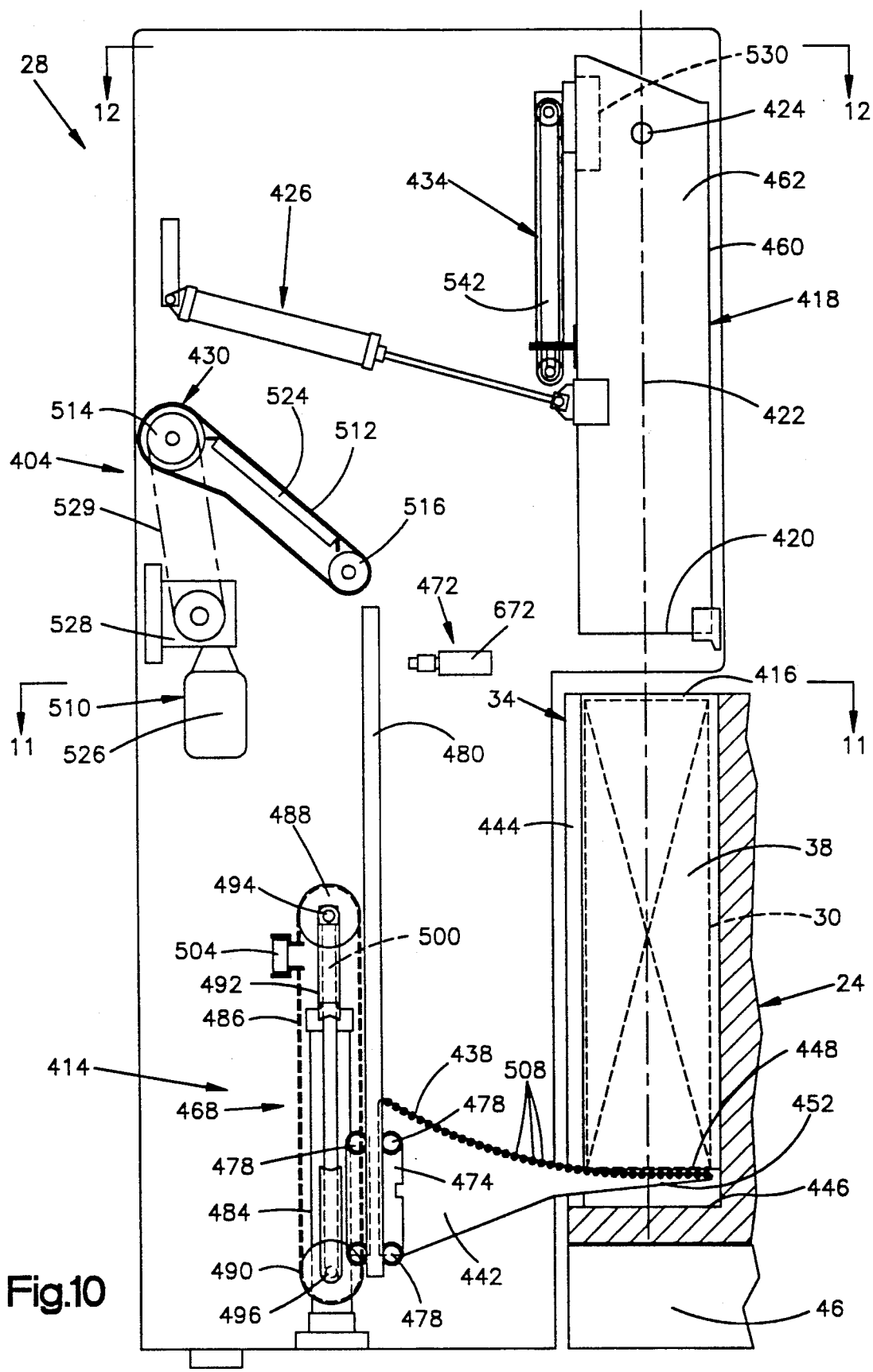
FIG. 10 is a side elevational view of an unloader assembly used in the apparatus of FIG. 1 and illustrating the relationship between a stack lift assembly and a hopper for receiving a stack of sheet material, the hopper being shown in an upright orientation.
Figure 13:
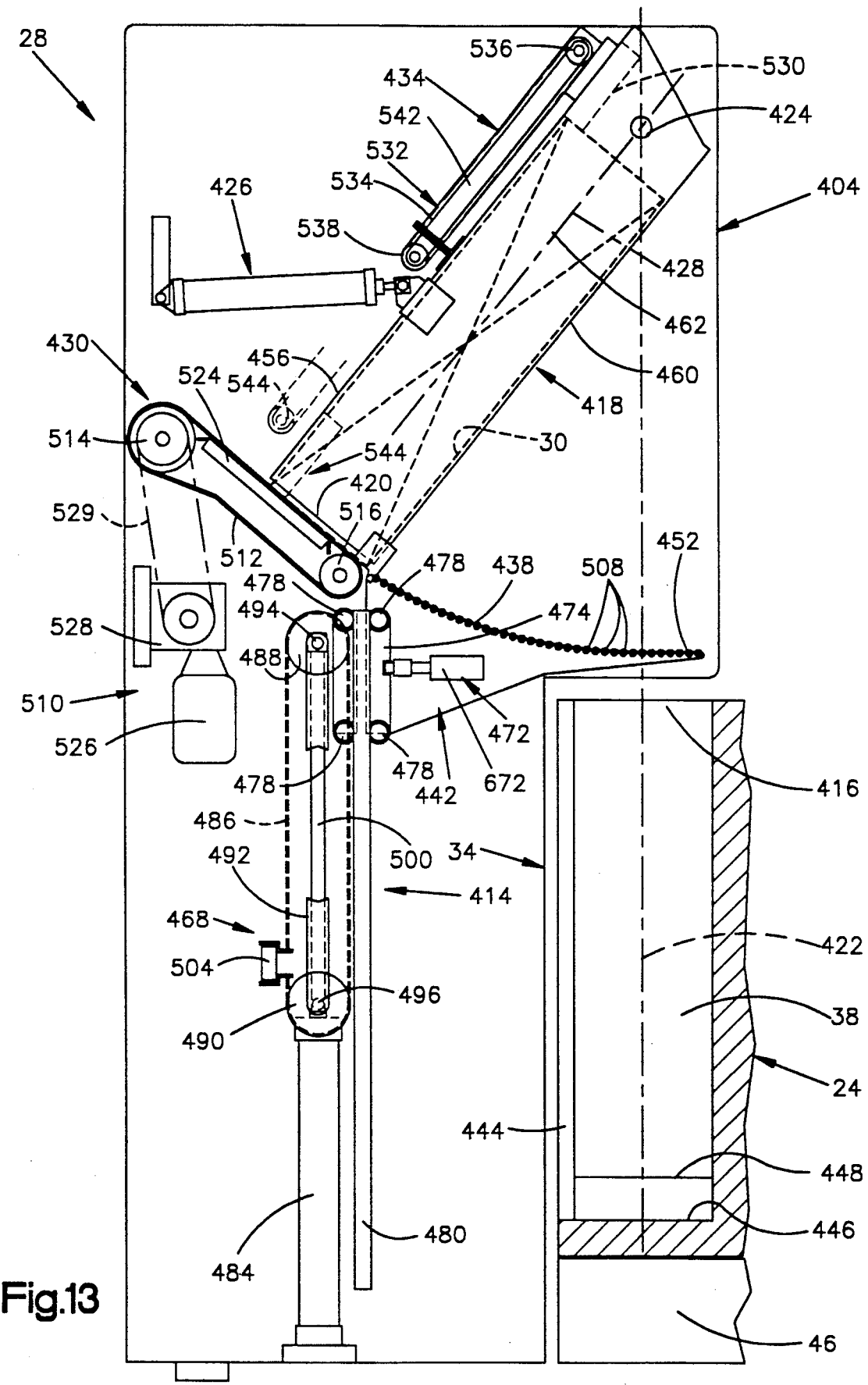
FIG. 13 is a side elevational view, generally similar to FIG. 10, illustrating the hopper in a tilted orientation and the stack lift forks in a raised position.

As the hopper 418 is moved from the upright orientation of FIG. 10 toward the tilted orientation of FIG. 13, the lower end portion of the stack 30 of sheet material in the hopper moves into engagement with a sheet material feed assembly 430. Thus, the lower end portion of the stack 30 of sheet material in the hopper 418 extends through the open lower end portion 420 of the hopper into engagement with the sheet material feed assembly 430. The tilted stack 30 of sheet material is supported by both the sheet material feed assembly 430 and the tilted side walls of the hopper 418.

Operation of the sheet material feed assembly 430 feeds the sheet material articles or signatures 22 upwardly and toward the left (as viewed in FIG. 13) to the discharge conveyor 400 (FIG. 1). During operation of the sheet material feed assembly 430, the stack 30 of sheet material is pressed downwardly against the sheet material feed assembly 430 by a stack presser assembly 434. Thus, the combined effect of the weight of the stack 30 of sheet material and the presser assembly 434 urges the lower end of the stack into engagement with the sheet material feed assembly 430.

During pivotal movement of the hopper 418 from the upright orientation of FIG. 10 toward the tilted orientation of FIG. 13, the lower end portion 420 of the hopper and the lower end portion of the stack 30 of sheet material move along an upwardly inclined ramp 438. The ramp 438 cooperates with the open lower end portion 420 of the hopper 418 to hold the stack 30 of sheet material in the hopper as the hopper is moved from its upright orientation (FIG. 10) toward its tilted orientation (FIG. 13). The ramp 438 has an arcuately curving configuration with a center of curvature on the central axis of axis hopper support shaft 424. Although it is preferred to have the ramp 438 be a portion of the stack transfer assembly 414, the ramp could be separate from the stack transfer assembly if desired.

The stack transfer assembly 414 lifts a stack 30 of sheet material from the compartment 38 of the container 24. As the stack 30 of sheet material is being lifted from the container 24 by the stack transfer assembly 414, the stack 30 is moved upwardly into the hopper 418 through the open lower end portion 420 of the hopper. Thus, as the stack 30 is being lifted, the upper portion of the stack is moving into the hopper 418 as the lower portion of the stack is moving out of the container compartment 38. Although it is preferred to operate the stack transfer assembly 414 in such a manner as to lift the stack 30 upwardly into the hopper 418, the stack transfer assembly could be operated so as to move the stack 30 into the hopper 418 in a different manner if desired.

Figure 11:
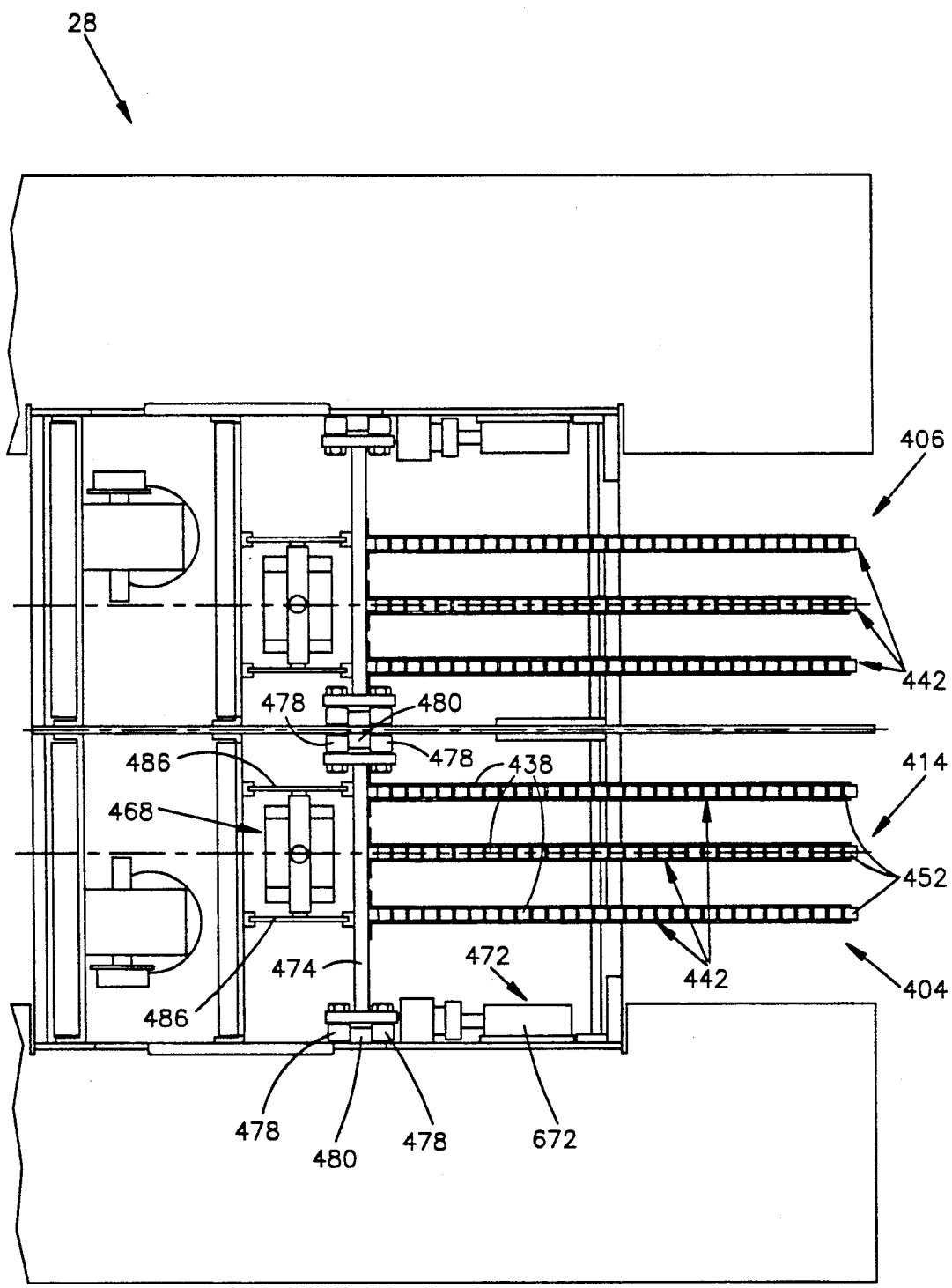
FIG. 11 is a sectional view, taken generally along the line 11—11 of FIG. 10, and illustrating the relationship between a plurality of stack lift forks and a lift drive assembly for raising and lowering the stack lift forks.

The stack transfer assembly 414 includes a plurality of lift members or forks 442 (FIGS. 10 and 11). The forks 442 extend through a slot 444 (FIG. 10) in the side wall of the container 24. The stack 30 is supported above the bottom 446 (FIGS. 10 and 13) of the container compartment 38 on a plurality of wooden slats or bars 448 (FIG. 13). The bars or slats 448 are spaced apart from each other and extend parallel to each other to form rectangular recesses at the lower end of the container compartment 38 to receive the lift forks 442.

When the lift forks 442 are in the lowered position shown in FIG. 10, the carriage assembly 52 (FIG. 6) is operable to move the container 24 from the index position 68 toward the loading position 34 with the rectangular recesses between the slats 448 aligned with the lift forks 442. As the container 24 moves to the loading position 34, outer end portions 452 of the forks 442 enter the rectangular recesses between the bottom of the stack 30 of sheet material and the bottom 446 of the container compartment 38 (FIG. 10).

Once the container 24 has been moved to the loading position 34 (FIG. 10), the rectangular container compartment 38 is vertically aligned with a similarly sized rectangular compartment or chamber 454 (FIG. 12) in the hopper 418. The container 24 has a rectangular array of side walls which define the container compartment 38. The rectangular array of container side walls is vertically aligned with a rectangular array of hopper side walls 456, 458, 460 and 462 (FIG. 12) which define the rectangular hopper chamber 454. Since the hopper chamber 454 and the container compartment 38 are the same size and are vertically aligned with each other when the container 24 is at the unloading position 34 and the hopper 418 is in the upright orientation of FIG. 10, the stack transfer assembly 414 can lift a stack 30 of sheet material vertically upwardly from the container 24 into the hopper 418.

A fork lift drive assembly 468 (FIGS. 10 and 11) is operable to move the lift forks 442 from the lowered position of FIG. 10 to the raised position of FIG. 13 to move a stack 30 of sheet material from the container compartment 38 into the hopper chamber 454 (FIG. 12) while the hopper 418 is in the upright orientation of FIG. 10. Thus, initial upward movement of the lift forks 442 by the drive assembly 468 (FIG. 10) moves the upper end portion of the stack 30 of sheet material through the open upper end portion 416 of the container compartment 38. Continued upward movement of the lift forks 442 moves the upper end portion of the stack 30 of sheet material through the open lower end portion 420 of the hopper 418 Continued upward movement of the lift forks 442 moves the stack 30 of sheet material out of the container compartment 38 and into the hopper chamber 464. During vertical upward movement of the stack 30 of sheet material, the stack is supported on the outer end portions 452 of the lift forks 442.

When the lift forks 442 have been moved to the raised position of FIG. 13, a lock assembly 472 (FIGS. 11 and 13) is operated from a disengaged condition to an engaged condition. When the lock assembly 472 is in the engaged condition, a dead bolt locks a lift fork carriage 474 (FIG. 11) in the raised position. Therefore, once the lift forks 442 have moved to the raised position to lift a stack 30 of sheet material into the hopper 418, the lift forks are locked in place so that they are not lowered for some unforeseen reason, such as a power failure for the fork lift drive assembly 468.

In the embodiment of the invention illustrated in FIGS. 10 and 11, there are three lift forks 442 (FIG. 11) which are fixedly connected to the lift fork carriage 474. Rollers 478 on the lift fork carriage 474 engage vertical tracks 480 (FIGS. 10 and 11) which extend upwardly along opposite side walls of the unloader unit 404. Of course, a greater or lesser number of lift forks 442 could be provided if desired.

The fork lift drive assembly 468 includes a piston and cylinder motor 484 (FIGS. 10 and 13) having a vertical central axis which extends parallel to the vertical central axis of the lift fork carriage track 480. Two sets of drive chains 486 (FIG. 11) extend around upper and lower sets of sprockets 488 (FIG. 10) and 490. The chains 486 are connected to the lift fork carriage 474. A pair of sprocket support bars 492 extend between horizontal axle shafts 494 upon which the upper and lower sprockets 488 and 490 are supported. The sprocket support bars 492 are connected with a piston rod 500 which is moved by the motor 484. Opposite ends of the chains 486 are fixedly secured to a stationary frame member 504.

When the motor 484 is operated from the retracted condition of FIG. 10 to the extended condition of FIG. 13, the piston rod 500 moves the sprocket support bars 492 and upper and lower sprockets 488 and 490 vertically upwardly from the lowered position of FIG. 10 t the raised position of FIG. 13. As the sprockets 488 and 490 move vertically upwardly, they interact with the chains 486 to rotate the sprockets in a counterclockwise direction (as viewed in FIGS. 10 and 13). As the sprockets 488 and 490 are rotated, the lift fork carriage 474, which is fixedly connected to the chains 486, is moved upwardly along the track 490. The interaction between the chains 486 and the sprockets 488 and 490 doubles the effective stroke of the motor 484 so that the lift fork carriage 474 is moved upwardly through a distance which is greater than the distance through which the piston rod 500 is moved upwardly.

When the stacks 30 of sheet material have been removed from both of the container compartments 36 and 38 by operation of the unloader units 404 and 406, the lift forks 442 for both motor units 404 and 406 will be in the raised position shown in FIG. 13 for the lift forks 442 of the unloader unit 404. While the lift forks 442 are in their raised position, the container 24 is moved away from the unloading position 34 to the index position 68 by operation of the carriage assembly 52 in the container handling assembly 46. The container 24 is rotated through 180° about a vertical axis at the index station 68 to move the empty container compartments 36 and 38 away from the unloader assembly 28 and to move the loaded container compartments 40 and 42 toward the unloader assembly.

During rotation of the container 24 about a vertical axis by the carriage assembly 52, the lift forks 442 remain in the raised position of FIG. 13 to eliminate any possibility of interference between the lift forks an rotating container. While the container 24 is at the index position offset to the right (as viewed in FIGS. 10 and 13) of the unloader assembly 28 and after rotation of the container by the carriage assembly 52, the lift forks 442 for the unloader units 404 and 406 (FIG. 11) are simultaneously moved downwardly to the lowered position (FIG. 10). Although it is preferred to lower the lift forks 442 after the container 24 has been rotated at the index station 68, in order to avoid interference between the lift forks and the container, it is contemplated that the unloader assembly 28 and container handling assembly 46 could be constructed so as to provide sufficient space to enable the container 24 to be rotated with the lift forks 442 in the lowered position of FIG. 10.

Once the stack 30 of sheet material has been moved into the upright hopper 418 by operation of the stack transfer assembly 414, the hopper is moved from the upright orientation of FIG. 10 to the tilted orientation of FIG. 13. Of course, this moves the stack 30 of sheet material in the hopper 418 from an upright orientation to a tilted orientation. As the hopper 418 and stack 30 of sheet material in the hopper move toward the tilted orientation, the stack of sheet material moves into engagement with the sheet material feed assembly 430.

To move the hopper 418 from the upright orientation of FIG. 10 to the tilted orientation of FIG. 13, the piston and cylinder type hopper motors 426 (FIG. 12) are operated from the extended condition of FIG. 10 to the retracted condition of FIG. 13. During initial retraction of the hopper motors 426, the hopper 418 starts to pivot about the support shaft 424 from the upright orientation. As this occurs, the stack 30 of sheet material in the hopper starts to move off of the outer end portions 452 of the lift forks 442 onto the ramps 438. Thus, the lower end portion 420 of the hopper 418 moves along the lift forks 442 to move the lower end portion of the stack 30 of sheet material in the hopper onto the ramps 438.

Continued pivoting movement of the hopper 418 moves the lower end portion 420 of the hopper and the lower end portion of the stack 30 of sheet material upwardly along the ramps 438. The ramps 438 are advantageously provided with cylindrical rollers 508 which rotate to facilitate movement of the stack 30 along the ramps 438. As the leading edge of the stack 30 of sheet material in the hopper 418 approaches the upper end of the ramps 438, the leading edge of the stack 30 of sheet material moves into engagement with the sheet material feed assembly 430.

At this time, a drive assembly 510 in the sheet material feed assembly 430 is operated at a slow speed. This slow speed of operation of the drive assembly 510 is selected to move feed belts 512 around a drive pulley 514 and an idler pulley 516 at the same speed as which the lower end of the hopper 418 is moved by pivotal movement of the hopper around the support shaft 424. Therefore, as the hopper 418 continues to tilt after the leading edge of the stack 30 of sheet material in the hopper has engaged the drive belts 512, there is little or no relative movement between the drive belts and the lower end portion of the stack 30 of sheet material.

As the hopper motors 426 ar operated to the fully retracted condition shown in FIG. 13, the lower end portion of the stack 30 of sheet material in the hopper 418 will have moved onto belts 512 (FIG. 12) in the sheet material feed assembly 430. At this time, the stack 30 of sheet material is supported by the sheet material feed assembly 430 (FIG. 13) and the hopper 418. Thus, the belts 512 engage the lower end of the stack 30 of sheet material to partially support the stack 30 of sheet material. The belts 512 are supported by a rigid metal pan or support 524.

Since both the hopper 418 and stack 30 of sheet material are tilted, a portion of the weight of the stack of sheet material is carried by the front wall 460 (FIG. 12) of the hopper 418. Although it is preferred to move the stack 30 of sheet material completely off of the ramps 438 (FIG. 13) to enable the lift forks 442 to be lowered, a portion of the stack of sheet material could be supported by the ramps 438 during feeding of sheet material by the sheet material feed assembly 430.

After the stack 30 of sheet material has been moved off of the ramps 438 on the lift forks 442 by tilting movement of the hopper 418, the lift forks can be moved from the raised position of FIG. 13 back to the lowered position of FIG. 10. Therefore, the lock assembly 472 is operated from the engaged condition to a disengaged condition to release the lift fork carriage 474 for downward movement. The fork lift drive motor 484 is maintained in the extended condition of FIG. 13 to hold the lift forks 442 in the raised position until after the container 24 has been moved away from the unloading position 34 and rotated at the index station 68.

When the fork lift drive motor 484 is operated from the extended condition of FIG. 13 to the retracted condition of FIG. 10, the upper and lower sprockets 488 and 490 are moved downwardly and the piston rod 500 is retracted. As the sprockets 488 and 490 move downwardly, they interact with the chains 486 to rotate in a clockwise direction. As this is occurring, the fork lift carriage 474 is moved downwardly at a speed which is approximately twice as great as the speed at which the piston rod 500 is retracted. Therefore, when the piston rod 500 is fully retracted, the fork lift carriage 474 will have moved downwardly to the lowered position shown in FIG. 10.

Once the lift forks 442 in both of the unloader units 404 and 406 have been lowered, the container handling assembly 46 moves the container 24 from the index station 68 back to the unloading station 34. At this time, the second pair of compartments, that is the compartments 40 and 42, are toward the unloader assembly 28. During lowering of the lift forks 442 and movement of the container 24 back to the unloading station 34, the sheet material feed assembly 430 is operated to feed sheet material from the lower end portion of the tilted stack 30 of sheet material in the hopper 418.

Although it is preferred to have the ramps 438 move with the lift forks 442, the ramps 438 could be maintained stationary at their raised positions. If this was done, the outer end portions 452 of the lift forks 442 would be moved between the lowered and raised positions.

While it is preferred to maintain the lift forks 442 stationary during pivotal movement of the hopper 418, it is contemplated that it may be desired to move the outer end portions 452 of the lift forks 442 with the hopper as the hopper is tilted. Movement of the outer end portions 452 of the forks 442 with the hopper could continue until the leading edge portion of the stack 30 of signatures moves into engagement with the sheet material feed assembly 430. The outer end portions 452 of the lift forks would then be disengaged from the stack 30 of sheet material. After disengagement of the outer end portions 452 of the lift forks 442 from the lower end portion of the stack 30 of sheet material, the stack would be supported by the hopper 418 and the sheet material feed assembly 430. If stationary ramps 438 were used, the stack of sheet material could also be supported by the ramps.

The sheet material feed assembly 430 sequentially feeds sheet material articles or signatures from the bottom of the tilted stack 30 (FIG. 13) The sheet material articles are fed upwardly and toward the left (as viewed in FIG. 13) from the bottom of the tilted stack 30 by the sheet material feed assembly 430. During the feeding of sheet material articles from the bottom of the tilted stack, the sheet material feed assembly 430 partially supports the stack.

The sheet material feed assembly 430 includes the plurality of belts 512 (FIG. 12) which extend around the drive pulley 514 and an idler pulley 516 (FIG. 13). The belt pan 524 is disposed beneath an upper run of the belts 512. The belt pan 524 supports the weight applied against the belts 512 by the tilted stack 30 of sheet material.

The belts 512 are driven by the drive pulley 514 (FIG. 13). The drive pulley is driven by belt drive motor 526 through a gear box 528. Drive force is transmitted from the gear box 528 to the drive pulley 514 by a chain drive 529. Suitable controls are provided to vary the speed of operation of the motor 526 to feed sheet material from the bottom of the tilted stack 30 at a desired rate.

When the hopper 418 is in the tilted orientation of FIG. 13, a portion of the weight of the stack 30 is carried by the front hopper wall 460. The stack presser assembly 434 presses against the upper end portion of the tilted stack 30 to press the bottom of the stack against the belts 512. The stack presser assembly 434 includes a presser member 530 which extends through a slot in the rear wall 456 (FIG. 12) of the hopper 418. A drive assembly 532 urges the presser member 530 downwardly against the upper end portion of the stack 30.

The presser drive assembly 532 (FIG. 13) has the same construction as the fork lift drive assembly 468. However, the presser drive assembly 532 is extended downwardly rather than upwardly as is the fork lift drive assembly 468. The presser drive assembly 532 includes chains 534 which extend around upper and lower sprockets 536 and 538. Opposite ends of the chains 534 ar fixedly connected to the rear side wall 456 of the hopper 418. The sprockets 536 and 538 are connected with the piston rod of a piston and cylinder type motor 542.

Upon operation of the motor 542, the presser member 530 is urged downwardly along the rear wall 456 of the hopper 418 toward the position shown in dashed lines at 544 (FIG. 13). Thus, the presser member 530 follows the upper end of the stack 30 downwardly in the hopper 418 as sheet material is fed from the hopper. This enables the presser member 530 to continuously pres the bottom of the stack 30 against the sheet material feed assembly 430.

When the hopper 418 is empty, the hopper is moved from the tilted orientation of FIG. 13 back to the upright orientation of FIG. 10 and the stack presser assembly 434 is retracted. Thus, the hopper motors 426 are operated from the retracted condition of FIG. 13 to the extended condition of FIG. 10. As the hopper motors 426 are extended, the lower end portion 420 of the empty hopper 418 is moved downwardly away from the sheet material feed assembly 430. At this time, the lift forks 442 will have already moved to their lowered positions (FIG. 10). When the hopper 418 reaches the upright orientation of FIG. 10, the hopper is positioned to receive a stack 30 of sheet material from another compartment of the container 234. Of course, the presser member 530 is moved back to the upper end of the hopper 418 by retraction of the presser assembly 434 before the next stack 30 is moved into the hopper.

Container

Each of the containers 24 (FIG. 1) includes four compartments 36, 38, 40, and 42 disposed in a rectangular array. As is perhaps best seen in conjunction with the empty container 24 shown at the right in FIG. 1, the compartments 36 and 38 share a common vertical inner side wall 582. Similarly, the compartments 38 and 40 share a common vertical inner wall 584. The compartments 40 and 42 share a common vertical inner wall 588. Finally, the compartments 36 and 42 share a common vertical inner wall 590. The inner walls 582, 584, 588 and 590 form an X having its center at the center of the container 24. When the carriage assembly 52 is operated to rotate the container 24 about a vertical axis, the carriage assembly rotates the container about a vertical axis which extends through the intersection of the inner walls 582, 584, 588 and 590.

The container compartments 36 and 38 have elongated vertically extending openings or slots 444 which face in the same direction and are disposed on one side of the container 24. Similarly, the compartments 40 and 42 have elongated vertically extending openings or slots 444 which are disposed on the opposite side of the container 24. A pair of major outer side walls 604 and 606 form outer side walls of the compartment. Thus, the walls 604 forms an outer side wall of the compartments 36 and 42 while the outer wall 606 forms a side wall of the compartments 38 and 40.

A pair of minor or flange wall sections 608 and 610 extend inwardly from opposite edge portions of the outer side wall 604 to partially define the openings 444 in opposite sides of the container 24 for the compartments 36 and 42. Similarly, a second pair of flange or minor wall sections 612 and 614 extend from opposite edge portions of the major wall 606 to partially define the openings 444 for the compartments 38 and 40. A pair of secondary or minor side walls 618 and 620 extend from opposite sides of the inner walls 582 and 588 to further define the openings 444 for the container compartments 36, 38, 40 and 42.

During unloading of stacks 30 of sheet material articles 22 from the container compartments 36, 38, 40 and 42, the lift forks 442 (FIG. 10) move vertically upwardly through each of the openings or slots 444 (FIG. 1) in turn to lift a stack 30 of sheet material articles out of a compartment of the container. The slats or blocks 448 form recesses at the lower end portions of the container 24 to receive the lift forks 442 as the container 24 is moved to the unloading station 34. Since the containers 24 are symmetrical on opposite sides of the inner walls 584 and 590, the containers can be positioned at the unloading station 34 in the orientation shown in FIG. 1 or in an orientation offset 180° from the orientation shown in FIG. 1. However, regardless of the orientation of the containers, the unloader units 404 and 406 could be operated to lift stacks of sheet materials from the compartments of the container either one-at-a-time or two-at-a-time.

Although the containers 24 are preferred for use in association with the unloader assembly 28, the containers could have a different construction if desired. For example, the containers could be constructed with only a pair of compartments, such as the compartments 36 and 42 or the compartments 36 and 38. If the container was constructed with a pair of compartments corresponding to the compartments 36 and 42, the carriage assembly 52 could be used in association with a single unloader unit 404. If the container was constructed with a pair of compartments corresponding to the compartments 36 and 38, a pair of unloader units 404 and 406 could be used to simultaneously unload both container compartments without rotating the container. Of course, the container could be constructed with a single compartment if desired.

Controls

Controls 660 (FIG. 14) for the unloader assembly 28 include valves for controlling the operation of the various motors in the unloader assembly. Thus, a valve 662 is operable to control the operation of the fork lift motor 484. A valve 664 is provided to control the operation of the lock assembly 472 for the fork lift carriage 474. A three-position four-way valve 666 is provided to control the operation of the hopper motors 426. Finally, a valve 668 is provided to control the operation of the stack presser assembly motor 542. Although only the controls 660 for the unloader unit 404 have been shown in FIG. 14, a similar set of controls are provided for the unloader unit 406.

Figure 14:
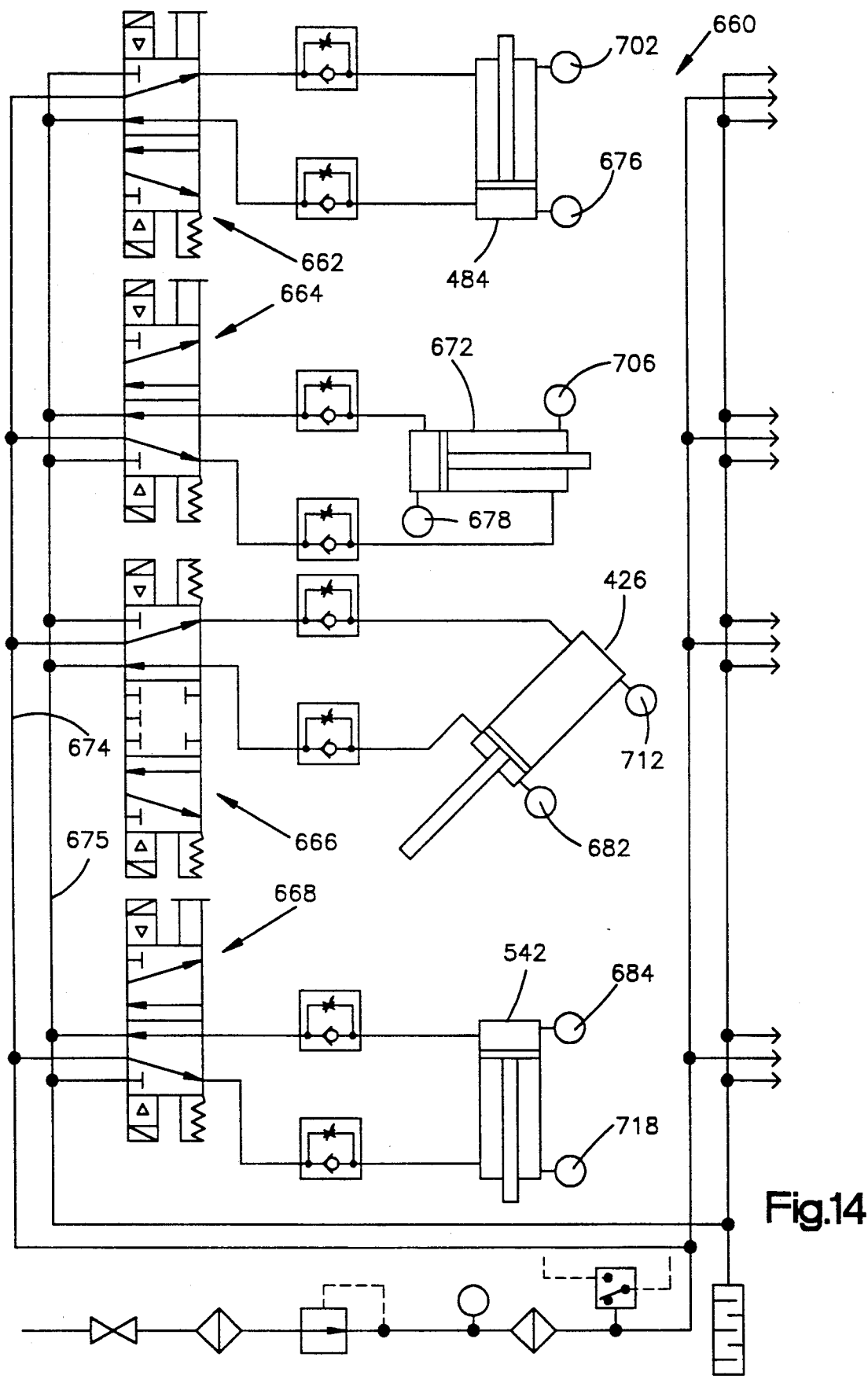
FIG. 14 is a schematic illustration of control apparatus used in association with the unloader assembly.

When the controls 660 are in the initial condition shown in FIG. 14, the unloader unit 404 is in the initial condition shown in FIG. 10. At this time, the fork lift motor 484 is retracted so that the lift forks 442 are in the lowered position. A motor 672 in the lock assembly 472 is in the retracted condition in which the lock assembly is disengaged. At this time, the hopper motors 426 are extended so that the hopper 418 is in the upright orientation of FIG. 10. Since the hopper 418 is empty, the stack presser assembly motor 542 is in the retracted condition in which the presser member 530 is adjacent to the upper end of the hopper 418.

Figure 15:
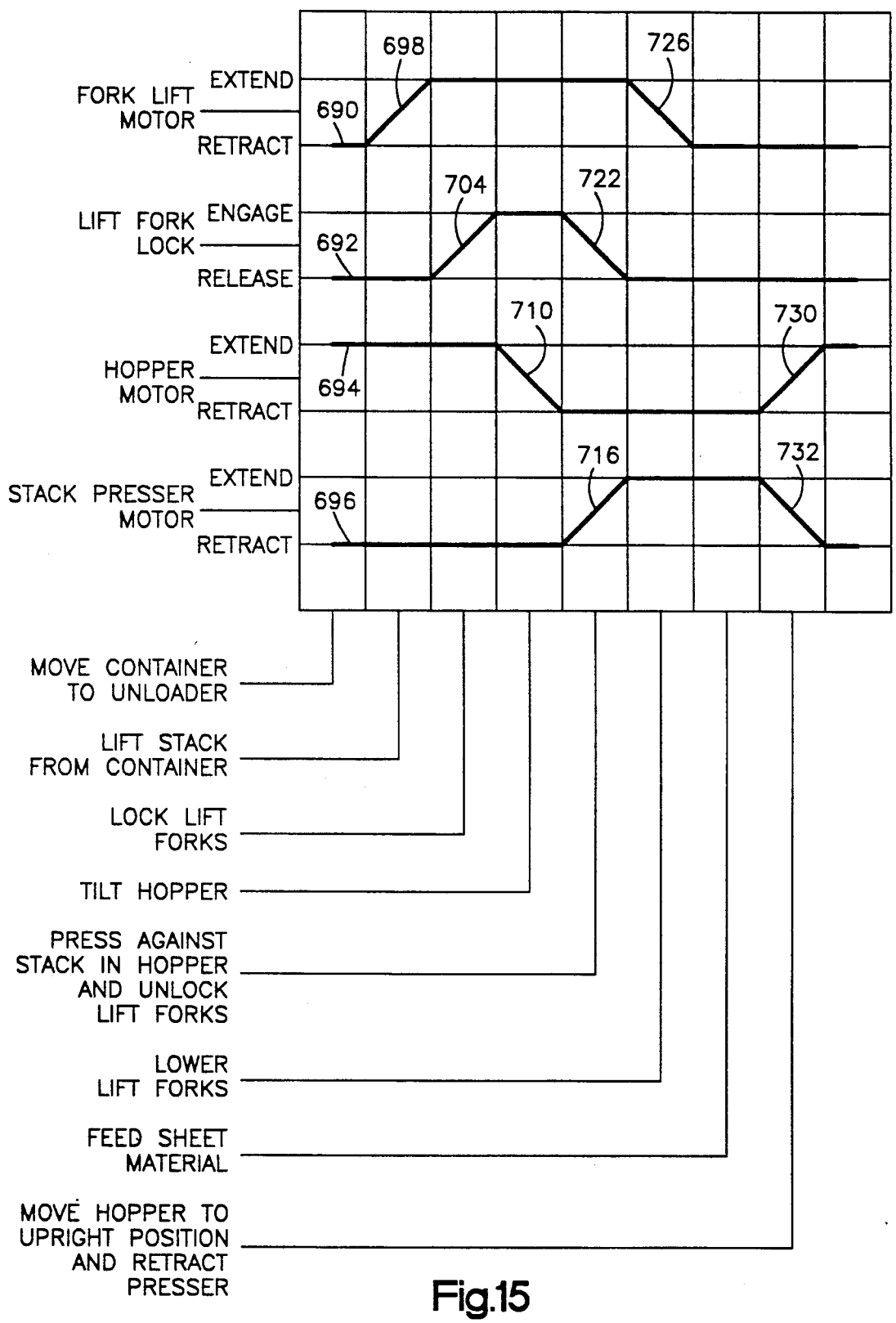
FIG. 15 is a chart depicting the sequence of operation of the various motors in the unloader assembly by the control apparatus of FIG. 14.

An operating cycle for the unloader unit 404 is illustrated schematically in FIG. 15. At the beginning of the cycle, as illustrated schematically in FIG. 15, the valves 662, 664, 666 and 668 are in the positions shown schematically in FIG. 14. Thus, at this time, control valve 662 directs fluid pressure (air) from a conduit 674 to the rod end of the fork lift motor 484. The control valve 662 connects the head end of the lift motor 484 with an exhaust conduit 675. This maintains the motor 484 in a retracted condition in which the lift forks 442 are in the lowered position shown in FIG. 10. A proximity switch 676 provides an output signal indicating that the lift forks 442 are in their lowered position.

At the beginning of the cycle, the control valve 664 directs fluid pressure to the rod end of the motor 672 in the lock assembly 472 (FIG. 11). This maintains the motor 672 in the retracted condition in which the lock assembly 472 is disengaged. A proximity switch 678 provides an output signal indicating that the lock assembly 472 is disengaged.

At the beginning of an operating cycle, the valve 666 directs air under pressure to the head ends of the hopper motors 426 to extend the hopper motors. This results in the hopper 418 being maintained in the upright orientation shown in FIG. 10. A proximity switch 682 provides an output signal indicating that the hopper 418 is in the upright orientation.

In addition, at the beginning of the operating cycle, the valve 668 is actuated to direct fluid pressure to the rod end of the stack presser motor 542 to retract the motor so that the presser member 530 is adjacent to the upper end of the hopper 418. A proximity switch 684 provides an output signal indicating that the presser member 530 is raised.

When the lift forks 442 are in the lowered position of FIG. 10, the container 24 is moved to the unloading station 34. As the container 24 moves to the unloading station, the stack 30 of sheet material in the compartment 38 moves over the outer end portions 452 of the lift forks 442 (FIG. 10). At this time, the hopper 418 is in an upright orientation and is vertically aligned with the container compartment 38.

The rear side wall 456 of the hopper 418 is vertically aligned with the flange wall sections 608 and 612 of the container 24 (see FIGS. 1 and 12). The front side wall 460 of the hopper 418 is vertically aligned with the container side wall 584. The hopper side walls 458 and 462 are vertically aligned with the container side walls 606 and 582. Therefore, the container compartment 38 is vertically aligned with the rectangular compartment 454 in the hopper 418.

An operating cycle of the unloader assembly 28 is illustrated schematically in FIG. 15. At the beginning of an operating cycle, the fork lift motor 484 is in the retracted position, indicated by the line 690 in FIG. 15, and the fork lift motor control valve 662 is in the position shown in FIG. 14. At this time, the lock assembly 472 is in the release or disengaged condition, indicated by the line 692 in FIG. 15. The lock assembly control valve 664 is in the condition shown in FIG. 14.

At the beginning of the cycle, the hopper motors 426 are in an extended condition, indicated by the line 694 in FIG. 15. The hopper motor control valve 666 is in the condition indicated in FIG. 14. Finally, the stack presser assembly motor 542 is retracted so that the presser member 530 is adjacent to the upper end of the hopper as indicated by the line 696 in FIG. 15. At this time, the presser motor control valve 668 is in the condition shown in FIG. 14.

Upon initiation of an operating cycle, the fork lift motor control valve 662 is operated to effect upward movement of the lift forks 442. This raises the stack 30 of sheet material upwardly through the open upper end portion 416 of the container compartment 38. The upwardly moving stack 30 moves through the open lower end portion 420 of the hopper 418 into the hopper compartment 454.

Thus, at the beginning of an operating cycle, the control valve 662 is actuated to direct high pressure fluid (air) to the head end chamber of the fork lift motor 484. This extends the fork lift motor 484 in the manner indicated by the line 698 in FIG. 15. As the fork lift motor 484 is extended, the lift forks 442 continue to move upwardly to telescopically move the stack 30 of sheet material into the hopper 418. When the stack 30 of sheet material has moved into the hopper 418, a proximity switch 702 (FIG. 14) detects that the fork lift motor 484 is at its upper end of stroke position.

When the proximity switch 702 detects that the fork lift motor 484 has been operated to its fully extended condition, the lock assembly control valve 664 is actuated to effect operation of the motor 672 to actuate the lock assembly 472 (FIGS. 11 and 13) to the engaged condition. Operation of the lock assembly motor 672 to the engaged condition is indicated by the line 704 in FIG. 15. When the lock assembly 272 reaches the engaged condition, a proximity switch 706 (FIG. 14) detects that the motor 672 is in the fully extended condition. Operation of the lock assembly 472 to the engaged condition holds the lift forks 442 against movement from the raised position shown in FIG. 13.

Once the lift forks 442 have been locked in the raised position, the hopper motors 426 are actuated from the extended condition of FIG. 10 to the retracted condition of FIG. 13 to move the stack 30 of sheet material in the hopper 418 along the ramps 438 on the lift forks 442. Thus, the hopper motor control valve 666 (FIG. 14) is actuated to direct air under pressure to the rod end chambers of the hopper motors 426. This causes the hopper motors 426 to be retracted, in the manner indicated schematically by the line 710 in FIG. 15.

Operation of the hopper motors 426 to the retracted condition shown in FIG. 13 is detected by a proximity switch 712 (FIG. 14). Once the hopper motors 426 have been retracted, the hopper motor control valve 666 is actuated to a center position in which fluid flow to and from the hopper motors 426 is blocked by the valve. This locks the hopper 418 in the tilted orientation shown in FIG. 13. While the hopper 418 is in the tilted orientation shown in FIG. 13, the sheet material feed assembly 430 is operated to feed sheet material upwardly from the open lower end of the hopper 418 to the discharge conveyor 400 (FIG. 1).

As sheet material is fed from the hopper 418 by the sheet material feed assembly 430, the stack presser motor 542 is operated to move the presser member 530 downwardly relative to the hopper 418. This results in the presser member 430 pressing the stack 30 of sheet material in the hopper 418 downwardly against the feed belts 512 in the sheet material feed assembly 430. Thus, the presser control valve 668 is actuated from the position shown in FIG. 14 to direct air under pressure to the head end of the presser motor 542. This pulls the presser member 530 downwardly against the upper end of the stack 30 of sheet material in the hopper 418. As sheet material is fed from the hopper 418, the presser motor 542 is operated in the manner indicated schematically by the line 716 in FIG. 15. When the stack 30 of sheet material has been completely fed from the hopper 418, a proximity switch 718 detects that the motor 542 has been operated to its fully extended condition.

After the stacks 30 of sheet material have been removed from the container compartments 36 and 38, the sheet material handling assembly 46 is operated to move the container compartments 40 and 42 to the unloading station 34. Thus, the carriage assembly 52 is moved away from the unloading station 34 to the index station 68. Once the container 24 has been moved to the index station 68, the carriage assembly is operated to rotate the container 24 about its vertical central axis. This moves the compartments 36 and 38 away from the unloader assembly 28 and moves the compartments 40 and 42 toward the unloader assembly. It should be noted that when the container 24 is at the index station 68, the container has moved far enough away from the unloader assembly 28 to enable the container to be rotated about its vertical central axis without interference with the unloader assembly. At this time, the lift forks 442 in the unloader units 404 and 406 are in their raised positions.

After the container 24 has been rotated at the indexing station 68, the lock assembly control valve 664 is actuated to retract the lock assembly motor 672 to actuate the lock assembly 472 to the release condition, in the manner indicated by the line 722 in FIG. 15. Once the lock assembly 472 has been disengaged, the lift forks 442 are free to move downwardly from the raised position of FIG. 13 back to the lowered position of FIG. 10. Since the container 24 has been moved to the index station 68 by the carriage assembly 52, there is nothing to interfere with downward movement of the lift forks 442.

During the feeding of sheet material from the bottom of the stack 30 in the hopper 418, the stack of sheet material is supported by the hopper and the belts 512 and pan 524 in the sheet material feed assembly 430. Therefore, the lift forks 442 can be moved downwardly from the raised position shown in FIG. 13 back to the lowered position shown in FIG. 10.

To effect downward movement of the lift forks 442, motor control valve 662 is actuated back to the condition shown in FIG. 14 to direct fluid pressure to the rod end of the fork lift motor 484. This results in the fork lift motor 484 being retracted, in the manner indicated schematically by the line 726 in FIG. 15. As the lift forks 442 are lowered, the sheet material feed assembly 430 continues to feed sheet material from the tilted hopper 418.

After the container 24 has been rotated and the lift forks 442 lowered, the carriage assembly 52 is operated to move the container from the indexing station 68 back to the unloading station 34. Some time after the container 24 has been rotated and moved back to the unloading station 34, the feeding of sheet material from the stack 30 of sheet material will be completed by the sheet material feed assembly 430. When this occurs, the hopper motor control valve 666 is actuated from the central position back to the position shown in FIG. 14. This directs air under pressure to the head end chamber to the hopper motors 426 to operate the hopper motors from the retracted condition of FIG. 13 to the extended condition of FIG. 10.

As the hopper motors 426 are operated toward the extended condition, the hopper 418 is pivoted from the tilted orientation of FIG. 13 back to the upright orientation of FIG. 10. When the hopper motors 426 have been fully extended and the hopper 418 has moved to the upright orientation, proximity switch 682 (FIG. 14) provides an output signal to a control apparatus which actuates the control valve 666 to the centered position locking the hopper 418 in the upright orientation. Operation of the hopper motors 426 from the retracted condition to the extended condition is indicated schematically by the line 730 in FIG. 15.

Simultaneously with operation of the hopper motors 418 from the tilted orientation back to the upright orientation, the stack presser assembly 434 mounted on the hopper is operated to move the presser member 530 from a position adjacent to the lower end of the hopper 418 to a position adjacent to the upper end of the hopper. Thus, the control valve 668 (FIG. 14) is actuated to effect operation of the presser member motor 542 from the extended condition to the retracted condition. Operation of the presser motor 542 from the extended condition to the retracted condition is indicated schematically by the line 732 in FIG. 15.

Once the hopper 418 has been moved back to the upright orientation and the presser member 530 raised to the upper end portion of the hopper, the unloader unit 404 is in the initial condition shown in FIG. 10. Therefore, the unloader unit 404 is ready to undertake a next cycle of operation. It should be noted that at this time, the container compartment 42 will be disposed adjacent to the unloader unit 404.

Once the container compartments 40 and 42 have been emptied by operation of the unloader assembly 28, the carriage assembly 52 moves the empty container 24 to the index station 68. The shuttle assembly 54 is extended int an overlapping relationship with the carriage assembly 52. The shuttle assembly 54 is then operated to its raised condition to lift the empty container 24 off of the carriage assembly 52. The shuttle assembly is then retracted to move the empty container 24 away from the unloader assembly 28.

Conclusion

In view of the foregoing description, it is apparent that the present invention provides a new and improved apparatus 20 and method for use in handling stacks of sheet material. The apparatus 20 may include the container handling assembly 46. The container handling assembly 46 includes a first shuttle assembly 50 which is operable to move a container 24 having a plurality of compartments 36, 38, 40 and 42 containing stacks 30 of sheet material onto a carriage assembly 52 adjacent to an unloader assembly 28. After the unloader assembly 28 has removed stacks 30 of sheet material from the container 24, the empty container is moved away from the carriage assembly 52 by a second shuttle assembly 54. In order to position the compartments 36, 38, 40 and 42 of the container 24 relative to the unloader assembly 28, the carriage assembly 52 may advantageously be operated to move the container toward and away from the unloader 28 assembly and to rotate the container 24 about a vertical axis.

An improved unloader assembly 28 may be used with the container handling assembly 46. The unloader assembly 28 includes a lift assembly 414 which engages the lower end of a stack 30 of sheet material in a compartment 36, 38, 40 or 42 of a container 28 and lifts the stack of sheet material upwardly through an open lower end portion 420 of an upright hopper 418. When the stack 30 of sheet material has been moved into the hopper 418 by the lift assembly 414, the hopper and the stack of sheet material are moved from an upright orientation to a tilted orientation. As the hopper 418 and stack 30 of sheet material are tilted, the stack of sheet material is moved along an upwardly inclined ramp 438 into engagement with a sheet material feed assembly 430. The sheet material feed assembly 430 is then operated to sequentially feed sheet material from the tilted stack 30.

Having described the invention, the following is claimed:

1. A sheet material handling apparatus for removing a stack of sheet material from a container and feeding sheet material from the stack of sheet material, said apparatus comprising a hopper having an open lower end portion, lift means for lifting the stack of sheet material upwardly from the container through the open lower end portion of said hopper to move the stack of sheet material into said hopper, surface means for defining an upwardly inclined ramp, hopper tilting means for moving said hopper from an upright orientation to a tilted orientation in which a central axis of said hopper is skewed at an acute angle to a vertical axis, said lift means being operable to lift the stack of sheet material through the open lower end portion of said hopper when said hopper is in the upright orientation, said hopper tilting means being operable to move the lower end portion of the stack of sheet material in said hopper along said upwardly inclined ramp as said hopper tilting means moves said hopper from the upright orientation toward the tilted orientation, and feed means for sequentially feeding sheets of material from a lower end portion of the stack of sheet material in said hopper, said feed means being operable to feed sheet material from the stack of sheet material in said hopper when said hopper is in the tilted orientation.

2. An apparatus as set forth in claim 1 wherein said feed means includes means for at least partially supporting the stack of sheet material when said hopper is in the tilted orientation, said lift means including means for moving said inclined ramp from a lowered position to a raised position during lifting of the stack of sheet material upwardly from the container and for moving said inclined ramp from a raised position to a lowered position while the stack of sheet material is at least partially supported by said feed means.

3. An apparatus as set forth in claim 1 wherein said lift means includes a portion of said inclined ramp which is engageable with the lower end portion of the stack of sheet material when the stack of sheet material is in the container and motor means for moving at least said portion of the inclined ramp upwardly.

4. A sheet material handling apparatus for removing a stack of sheet material from a container having a compartment for holding a stack of sheet material and feeding sheet material from the stack of sheet material, said apparatus comprising a hopper having an open lower end portion, means for supporting said hopper for pivotal movement, lift means for lifting the stack of sheet material upwardly from the container through the open lower end portion of said hopper to move the stack of sheet material into said hopper, means for pivoting said hopper from an upright orientation in which a central axis of said hopper is vertically aligned with a vertical central axis of the compartment in the container to a tilted orientation in which the lower end portion of said hopper is offset to one side of the compartment in the container, and feed means for sequentially feeding sheets of material from a lower end portion of the stack of sheet material in said hopper when said hopper is in the tilted orientation.

5. An apparatus as set forth in claim 4 wherein said feed means includes means for sequentially feeding sheet material from the lower end portion of said hopper while said hopper is in the tilted orientation.

6. An apparatus a set forth in claim 4 wherein said lift means is operable to lift the stack of sheet material upwardly through the open lower end portion of said hopper when said hopper is in the upright orientation with the vertical central axis of said hopper vertically aligned with the vertical central axis of the compartment in the container.

7. An apparatus as set forth in claim 4 wherein said lift means includes a movable support which is engageable with a lower end portion of the stack of sheet material in the compartment of the container and motor means for moving said movable support upwardly along a linear path to move the stack of sheet material upwardly through the open lower end portion of said hopper when said hopper is in the upright orientation.

8. An apparatus as set forth in claim 7 wherein said movable support is disposed in engagement with the lower end portion of the stack of sheet material during pivoting of said hopper from the upright orientation to the tilted orientation.

9. An apparatus as set forth in claim 8 wherein said movable support includes surface means for defining an upwardly inclined ramp which engages the lower end portion of the stack of sheet material during pivoting of said hopper from the upright orientation to the tilted orientation.

10. An apparatus as set forth in claim 4 wherein the container has a plurality of compartments with open upper end portions, said apparatus further including carriage means for supporting the container at an unloading position with an open upper end portion of a first container compartment beneath said hopper, said lift means being operable to lift a first stack of sheet material upwardly through the open upper end portion of the first container compartment and through the open lower end portion of said hopper to position the first stack of sheet material in said hopper, said carriage means including a container support section, first drive means for moving said container support section along a first path in a direction away from the unloading position to an indexing position, and second drive means for rotating said container support section about a vertical axis at the indexing position to change the orientation of the container relative to said hopper from a first orientation to a second orientation by moving the first container compartment away from said hopper and moving a second container compartment toward said hopper, said first drive means being operable to move said container support section along the first path from the indexing position with the container in the second orientation to move the container to the unloading position and to move the second container compartment beneath said hopper, said lift means being operable to lift a second stack of sheet material upwardly through the open upper end portion of the second container compartment and through the open lower end portion of said hopper to position the second stack of sheet material in said hopper when the container is in the second orientation at the unloading position.

11. An apparatus as set forth in claim 10 further including first shuttle means movable along a second path which extends transversely to the first path to move the container from a position offset to one side of said carriage means to said carriage means, and second shuttle means being movable along the second path to move the container from said carriage means to a position offset to one side of said carriage means.

12. An apparatus as set forth in claim 4 further including first shuttle means operable from a retracted condition to an extended condition to move the container from a position offset to a first side of said hopper to an unloading position in which the container is disposed beneath the hopper and in which the vertical central axis of the compartment in the container is vertically aligned with the central axis of said hopper, and second shuttle means operable from an extended condition to a retracted condition to move the container from the unloading position to a position offset to a second side of said hopper.

13. An apparatus as set forth in claim 4 wherein the container has a plurality of compartments with open upper end portions, said apparatus further including carriage means for supporting the container with a first container compartment beneath said hopper, for rotating the container about a vertical axis to move the first container compartment away from said hopper and to move a second container compartment toward said hopper, and for supporting the container with the second container compartment beneath said hopper, said lift means being operable to lift first stack of sheet material upwardly along a linear path through the open upper end portion of the first container compartment and through the open lower end portion of said hopper while the container is supported by said carriage means with the first container compartment beneath said hopper, said lift means being operable to lift a second stack of sheet material upwardly along the linear path through the open upper end portion of the second container compartment and through the open lower end portion of said hopper while the container is supported by said carriage means with the second container compartment beneath said hopper.

14. A sheet material handling apparatus for removing a stack of sheet material from a container having a rectangular array of panels which at least partially define a compartment for holding the stack of sheet material and feeding sheet material from the stack of sheet material, said apparatus comprising a hopper having an open lower end portion, said hopper including a rectangular array of panels which at least partially define a compartment for holding the stack of sheet material, said rectangular array of hopper panels at least partially defining the open lower end portion of said hopper, lift means for lifting the stack of sheet material upwardly from the container through the open lower end portion of said hopper to move the stack of sheet material into said hopper, said lift means being operable to lift the stack of sheet material upwardly from the container through the open lower end portion of said hopper when said hopper is in an upright orientation with the rectangular array of hopper panels vertically aligned with the rectangular array of container panels, said apparatus further including means for moving said hopper from the upright orientation to a tilted orientation with a stack of sheet material in said hopper, the rectangular array of hopper panels extending at an acute angle to the rectangular array of container panels when said hopper is in the tilted orientation, the lower end portion of said hopper being offset to one side of the rectangular array of container panels when said hopper is in the tilted orientation, and feed means for sequentially feeding sheets of material from a lower end portion of the stack of sheet material in said hopper.

15. A sheet material handling apparatus comprising hopper means for holding a stack of sheet material, said hopper means having an open lower end portion, said hopper means including a rectangular array of panels having inner side surfaces which are disposed adjacent to sides of a stack of sheet material in said hopper means, ramp means for engaging a lower end portion of a stack of sheet material disposed in said hopper means to at least partially support the stack of sheet material when the open lower end portion of said hopper means is adjacent to a lower end portion of said ramp means, sheet material feed means disposed adjacent to an upper end portion of said ramp means for sequentially feeding sheet material from a lower end portion of the stack of sheet material in said hopper means when the lower end portion of said hopper means is adjacent to the upper end portion of said ramp means, and motor means for moving the lower end portion of said hopper means and the lower end portion of the stack of sheet material in said hopper means upwardly along said ramp means toward a position in which the lower end portion of the stack of sheet material in said hopper means engages said sheet material feed means, said rectangular array of panels and the stack of sheet material in said hopper means being disposed in an upright orientation when the open lower end portion of said hopper means is adjacent to the lower end portion of said ramp means, said rectangular array of panels and the stack of sheet material in said hopper means being disposed in a tilted orientation when the open lower end portion of said hopper means is adjacent to the upper end portion of said ramp means, said rectangular array of panels at least partially supporting the stack of sheet material in said hopper means when said hopper means is in the tilted orientation.

16. An apparatus as set forth in claim 15 further including presser means mounted on said hopper means for applying a downwardly directed force against an upper end portion of the stack of sheet material in said hopper means when the lower end portion of the stack of sheet material in said hopper means engages said sheet material feed means and said hopper means is in the tilted orientation.

17. An apparatus as set forth in claim 15 wherein said hopper means includes means for supporting said rectangular array of panels for pivotal movement, said motor means being operable to pivot said rectangular array of panels to move the stack of sheet material upwardly along said ramp means.

18. An apparatus as set forth in claim 17 wherein the stack of sheet material extends through the open lower end portion of said hopper means into engagement with said ramp means during pivotal movement of said rectangular array of panels, said rectangular array of panels having an upper end portion which is supported for pivotal movement about a stationary horizontal axis by said means for supporting said rectangular array of panels for pivotal movement.

19. An apparatus as set forth in claim 15 wherein said sheet material feed means includes means for sequentially engaging sheet material articles at the lower end portion of the stack of sheet material in said hopper means and for sequentially feeding the sheet material articles upwardly away from the lower end portion of the stack of sheet material in said hopper means when said rectangular array of panels is in the tilted orientation and the lower end portion of said hopper means is adjacent to the upper end portion of said ramp means.

20. An apparatus as set forth in claim 15 further including lift means for lifting a stack of sheet material upwardly through the open lower end portion of said hopper means to position the stack of sheet material in said hopper means when said rectangular array of panels is in the upright orientation.

21. An apparatus as set forth in claim 15 wherein said motor means is operable to tilt said rectangular array of panels from the upright orientation in which a central axis of said rectangular array of panels is vertical to the tilted orientation in which the central axis of said rectangular array of panels is skewed at an acute angle to a vertical axis during movement of the lower end portion of said hopper means upwardly along said ram means.

22. An apparatus as set forth in claim 15 further including stack transfer means for sequentially transferring stacks of sheet material to said hopper means from containers having a plurality of compartments for holding stacks of sheet material, carriage means for supporting a container at an unloading position, said stack transfer means being operable to move a first stack of sheet material from a first compartment of the container to said hopper means when the container is supported at the unloading position by said carriage means with the container in a first orientation, said carriage means including a container support section, first drive means for moving said container support section along a first path in a direction away from the unloading position to an indexing position, and second drive means for rotating said container support section about a vertical axis at the indexing position to change the orientation of the container relative to said stack transfer means from the from the first orientation to a second orientation by moving the first container compartment away from said stack transfer means and moving a second container compartment toward said stack transfer means, said first drive means being operable to move said container support section along the first path from the indexing position with the container in the second orientation to move the container to the unloading position, said stack transfer means being operable to move a second stack of sheet material from the second container compartment to said hopper means when the container is in the second orientation at the unloading position.

23. An apparatus as set forth in claim 22 further including first shuttle means movable along a second path which extends transversely to the first path to move a container from a position offset to one side of said carriage means to said carriage means, and second shuttle means movable along the second path to move the container from said carriage means to a position offset to one side of said carriage means.

24. An apparatus as set forth in claim 15 further including stack transfer means for sequentially transferring stacks of sheet material to said hopper means from containers, first shuttle means operable from a retracted condition to an extended condition to move a container from a position offset to a first side of said stack transfer means to a position in which the container is disposed adjacent to said stack transfer means, and second shuttle means operable from an extended condition to a retracted condition to move the container from a position adjacent to said stack transfer means to a position offset to a second side of said stack transfer means.

25. An apparatus as set forth in claim 15 further including stack transfer means sequentially transferring stacks of sheet material to said hopper means from a container having a plurality of compartments for holding stacks of sheet material, and means for rotating the container about a vertical axis from a first orientation in which a first compartment of the container is adjacent to said stack transfer means to a second orientation in which a second compartment of the container is adjacent to said stack transfer means, said stack transfer means being operable to transfer a stack of sheet material from the first compartment of the container to said hopper means when the container is in the first orientation, said stack transfer means being operable to transfer a stack of sheet material from the second compartment of the container to said hopper means when the container is in the second orientation.

26. An apparatus as set forth in claim 25 wherein said stack transfer means includes means for lifting a stack of sheet material upwardly from the first compartment of the container and through the open lower end portion of said hopper means when the container is in the first orientation and for lifting a stack of sheet material upwardly from the second compartment of the container and through the open lower end portion of said hopper means when the container is in the second orientation.

27. A sheet material handling apparatus comprising hopper means for holding a stack of sheet material, said hopper means having an open lower end portion, lift means for lifting a stack of sheet material upwardly through the open lower end portion of said hopper means to position the stack of sheet material in said hopper means, ramp means for engaging a lower end portion of a stack of sheet material disposed in said hopper means to at least partially support the stack of sheet material when the open lower end portion of said hopper means is adjacent to a lower end portion of said ramp means, sheet material feed means disposed adjacent to an upper end portion of said ramp means for sequentially feeding sheet material from a lower end portion of the stack of sheet material in said hopper means when the lower end portion of said hopper means is adjacent to the upper end portion of said ramp means, and motor means for moving the lower end portion of said hopper means and the lower end portion of the stack of sheet material in said hopper means upwardly along said ramp means toward a position in which the lower end portion of the stack of sheet material in said hopper means engages said sheet material feed means.

28. An apparatus as set forth in claim 27 wherein said hopper means includes a hopper and means for supporting said hopper for pivotal movement, said motor means being operable to pivot said hopper to move the stack of sheet material upwardly along said ramp means.

29. An apparatus as set forth in claim 28 wherein the stack of sheet material extends through the open lower end portion of said hopper means into engagement with said ramp means during pivotal movement of said hopper, said hopper having an upper end portion which is supported for pivotal movement about a stationary horizontal axis by said means for supporting said hopper for pivotal movement.

30. An apparatus as set forth in claim 27 wherein said sheet material feed means at least partially supports the stack of sheet material in said hopper means when the open lower end portion of said hopper means is adjacent to the upper end portion of said ramp means.

31. An apparatus as set forth in claim 27 wherein said sheet material feed means includes means for sequentially engaging sheet material articles at the lower end portion of the stack of sheet material in said hopper means and for sequentially feeding the sheet material articles upwardly away from the lower end portion of the stack of sheet material in said hopper means when the lower end portion of said hopper means is adjacent to the upper end portion of said ramp means.

32. An apparatus as set forth in claim 27 wherein said hopper means includes a rectangular array of panels having inner side surfaces which are disposed adjacent to sides of a stack of sheet material in said hopper means, said rectangular array of panels and the stack of sheet material in said hopper means being disposed in an upright orientation when the open lower end portion of said hopper means is adjacent to the lower end portion of said ramp means, said rectangular array of panels and the stack of sheet material in said hopper means being disposed in a tilted orientation when the open lower end portion of said hopper means is adjacent to the upper end portion of said ramp means, said rectangular array of panels at least partially supporting the stack of sheet material in said hopper means when said hopper means is in the tilted orientation.

33. An apparatus as set forth in claim 27 further including presser means mounted on said hopper means for applying a downwardly directed force against an upper end portion of the stack of sheet material in said hopper means when the lower end portion of the stack of sheet material in said hopper means engaged said sheet material feed means and said hopper means is in the tilted orientation.

34. An apparatus as set forth in claim 27 wherein said motor means is operable to tilt said hopper means from an upright orientation in which a central axis of said hopper means is vertical to a tilted orientation in which the central axis of said hopper means is skewed at an acute angle to a vertical axis during movement of the lower end portion of said hopper means upwardly along said ramp means.

35. An apparatus as set forth in claim 34 wherein the stack of sheet material in said hopper means is at least partially supported by said hopper means when said hopper means is in the tilted orientation.

36. An apparatus as set forth in claim 34 wherein said lift means includes second motor means for moving said ramp means from a lowered position to a raised position to lift a stack of sheet material upwardly through the open lower end portion of said hopper means when said hopper means is in the upright orientation.

37. An apparatus as set forth in claim 27 wherein said lift means is operable to sequentially transfer stacks of sheet material to said hopper means from containers having a plurality of compartments for holding stacks of sheet material, carriage means for supporting a container at an unloading position, said lift means being operable to move a first stack of sheet material from a first compartment of the container to said hopper means when the container is supported at the unloading position by said carriage means with the container in a first orientation, said carriage means including a container support section, first drive means for moving said container support section along a first path in a direction away from the unloading position to an indexing position, and second drive means for rotating said container support section about a vertical axis at the indexing position to change the orientation of the container relative to said lift means from the first orientation to a second orientation by moving the first container compartment away from said lift means and moving a second container compartment toward said lift means, said first drive means being operable to move said container support section along the first path from the indexing position with the container in the second orientation to move the container to the unloading position, said lift means being operable to move a second stack of sheet material from the second container compartment to said hopper means when the container is in the second orientation at the unloading position.

38. An apparatus as set forth in claim 37 further including first shuttle means movable along a second path which extends transversely to the first path to move a container from a position offset to one side of said carriage means to said carriage means, and second shuttle means movable along the second path to move the container from said carriage means to a position offset to one side of said carriage means.

39. An apparatus as set forth in claim 37 wherein said lift means includes means for lifting a stack of sheet material upwardly from the first compartment of the container and through the open lower end portion of said hopper means when said carriage means supports the container at the unloading position in the first orientation and for lifting a stack of sheet material upwardly from the second compartment of the container and through the open lower end portion of said hopper means when said carriage means supports the container at the unloading position in the second orientation.

40. An apparatus as set forth in claim 27 further including first shuttle means operable from a retracted condition to an extended condition to move a container from a position offset to a first side of said lift means to a position in which the container is disposed adjacent to said lift means, and second shuttle means operable from an extended condition to a retracted condition to move the container from a position adjacent to said lift means to a position offset to a second side of said lift means.

41. An apparatus as set forth in claim 27 wherein said lift means is operable to sequentially transfer stacks of sheet material to said hopper means from a container having a plurality of compartments for holding stacks of sheet material, said apparatus further including means for rotating the container about a vertical axis from a first orientation in which a first compartment of the container is adjacent to said lift means to a second orientation in which a second compartment of the container is adjacent to said lift means, said lift means being operable to lift a stack of sheet material upwardly from the first compartment of the container to said hopper means when the container is in the first orientation, said lift means being operable to lift a stack of sheet material from the second compartment of the container to said hopper means when the container is in the second orientation.

42. An apparatus as set forth in claim 41 wherein said lift means includes means is operable to lift a stack of sheet material upwardly from the first compartment of the container and through the open lower end portion of said hopper means when the container is in the first orientation and to lift a stack of sheet material upwardly from the second compartment of the container and through the open lower end portion of said hopper means when the container is in the second orientation.

43. A sheet material handling apparatus comprising hopper means for holding a stack of sheet material, said hopper means having an open lower end portion, ramp means for engaging a lower end portion of a stack of sheet material disposed in said hopper means to at least partially support the stack of sheet material when the open lower end portion of said hopper means is adjacent to a lower end portion of said ramp means, sheet material feed means disposed adjacent to an upper end portion of said ramp means for sequentially feeding sheet material from a lower end portion of the stack of sheet material in said hopper means when the lower end portion of said hopper means is adjacent to the upper end portion of said ramp means, motor means for moving the lower end portion of said hopper means and the lower end portion of the stack of sheet material in said hopper means upwardly along said ramp means toward a position in which the lower end portion of the stack of sheet material in said hopper means engages said sheet material feed means, said motor means being operable to tilt said hopper means from an upright orientation in which a central axis of said hopper means is vertical to a tilted orientation in which the central axis of said hopper means is skewed at an acute angle to a vertical axis during movement of the lower end portion of said hopper means upwardly along said ramp means, and second motor means for moving said ramp means from a lowered position to a raised position to lift a stack of sheet material upwardly through the open lower end portion of said hopper means when said hopper means is in the upright orientation.

44. An apparatus as set forth in claim 43 wherein the stack of sheet material extends through the open lower end portion of said hopper means into engagement with said ramp means during tilting movement of said hopper means.

45. An apparatus as set forth in claim 43 wherein said sheet material feed means at least partially supports the stack of sheet material in said hopper means when the open lower end portion of said hopper means is adjacent to the upper end portion of said ramp means.

46. An apparatus as set forth in claim 43 wherein said sheet material feed means includes means for sequentially engaging sheet material articles at the lower end portion of the stack of sheet material in said hopper means and for sequentially feeding the sheet material articles upwardly away from the lower end portion of the stack of sheet material in said hopper means when the lower end portion of said hopper means is adjacent to the upper end portion of said ramp means.

47. A sheet material handling apparatus comprising hopper means for holding a stack of sheet material, said hopper means having an open lower end portion, ramp means for engaging a lower end portion of a stack of sheet material disposed in said hopper means to at least partially support the stack of sheet material when the open lower end portion of said hopper means is adjacent to a lower end portion of said ramp means, sheet material feed means disposed adjacent to an upper end portion of said ramp means for sequentially feeding sheet material from a lower end portion of the stack of sheet material in said hopper means when the lower end portion of said hopper means is adjacent to the upper end portion of said ramp means, motor means for moving the lower end portion of said hopper means and the lower end portion of the stack of sheet material in said hopper means upwardly along said ramp means toward a position in which the lower end portion of the stack of sheet material in said hopper means engages said sheet material feed means, stack transfer means for sequentially transferring stacks of sheet material to said hopper means from containers having a plurality of compartments for holding stacks of sheet material, carriage means for supporting a container at an unloading position, said stack transfer means being operable to move a first stack of sheet material from a first compartment of the container to said hopper means when the container is supported at the unloading position by said carriage means with the container in a first orientation, said carriage means including a container support section, first drive means for moving said container support section along a first path in a direction away from the unloading position to an indexing position, and second drive means for rotating said container support section about a vertical axis at the indexing position to change the orientation of the container relative to said stack transfer means from the first orientation to a second orientation by moving the first container compartment away from said stack transfer means and moving a second container compartment toward said stack transfer means, said first drive means being operable to move said container support section along the first path from the indexing position with the container in the second orientation to move the container to the unloading position, said stack transfer means being operable to move a second stack of sheet material from the second container compartment to said hopper means when the container is in the second orientation at the unloading position, said stack transfer means includes means for lifting a stack of sheet material upwardly from the first compartment of the container and through the open lower end portion of said hopper means when said carriage means supports the container at the unloading position in the first orientation and for lifting a stack of sheet material upwardly from the second compartment of the container and through the open lower end portion of said hopper means when said carriage means supports the container at the unloading position in the second orientation.

48. An apparatus as set forth in claim 47 further including first shuttle means movable along a second path which extends transversely to the first path to move a container from a position offset to one side of said carriage means to said carriage means, and second shuttle means movable along the second path to move the container from said carriage means to a position offset to one side of said carriage means.

49. An apparatus as set forth in claim 47 wherein said hopper means includes a hopper and means for supporting said hopper for pivotal movement, said motor means being operable to pivot said hopper to move the stack of sheet material upwardly along said ramp means.

50. An apparatus as set forth in claim 49 wherein the stack of sheet material extends through the open lower end portion of said hopper means into engagement with said ramp means during pivotal movement of said hopper, said hopper having an upper end portion which is supported for pivotal movement about a stationary horizontal axis by said means for supporting said hopper for pivotal movement.

51. An apparatus as set forth in claim 47 wherein said sheet material feed means at least partially supports the stack of sheet material in said hopper means when the open lower end portion of said hopper means is adjacent to the upper end portion of said ramp means.

52. An apparatus as set forth in claim 47 wherein said sheet material feed means includes means for sequentially engaging sheet material articles at the lower end portion of the stack of sheet material in said hopper means and for sequentially feeding the sheet material articles upwardly away from the lower end portion of the stack of sheet material in said hopper means when the lower end portion of said hopper means is adjacent to the upper end portion of said ramp means.

53. A sheet material handling apparatus comprising hopper means for holding a stack of sheet material, said hopper means having an open lower end portion, ramp means for engaging a lower end portion of a stack of sheet material disposed in said hopper means to at least partially support the stack of sheet material when the open lower end portion of said hopper means is adjacent to a lower end portion of said ramp means, sheet material feed means disposed adjacent to an upper end portion of said ramp means for sequentially feeding sheet material from a lower end portion of the stack of sheet material in said hopper means when the lower end portion of said hopper means is adjacent to the upper end portion of said ramp means, motor means for moving the lower end portion of said hopper means and the lower end portion of the stack of sheet material in said hopper means upwardly along said ramp means toward a position in which the lower end portion of the stack of sheet material in said hopper means engages said sheet material feed means, stack transfer means for sequentially transferring stacks of sheet material to said hopper means from containers having a plurality of compartments for holding stacks of sheet material, and means for rotating the container about a vertical axis from a first orientation in which a first compartment of the container is adjacent to said stack transfer means to a second orientation in which a second compartment of the container is adjacent to said stack transfer means, said stack transfer means being operable to transfer a stack of sheet material from the first compartment of the container to said hopper means when the container is in the first orientation, said stack transfer means being operable to transfer a stack of sheet material from the second compartment of the container to said hopper means when the container is in the second orientation, said stack transfer means includes means for lifting a stack of sheet material upwardly from the first compartment of the container and through the open lower end portion of said hopper means when the container is in the first orientation and for lifting a stack of sheet material upwardly from the second compartment of the container and through the open lower end portion of said hopper means when the container is in the second orientation.

54. An apparatus as set forth in claim 53 wherein said hopper means includes a hopper and means for supporting said hopper for pivotal movement, said motor means being operable to pivot said hopper to move the stack of sheet material upwardly along said ramp means.

55. An apparatus as set forth in claim 54 wherein the stack of sheet material extends through the open lower end portion of said hopper means into engagement with said ramp means during pivotal movement of said hopper, said hopper having an upper end portion which is supported for pivotal movement by said means for supporting said hopper for pivotal movement.

56. An apparatus as set forth in claim 53 wherein said sheet material feed means at least partially supports the stack of sheet material in said hopper means when the open lower end portion of said hopper means is adjacent to the upper end portion of said ramp means.

57. An apparatus as set forth in claim 53 wherein said sheet material feed means includes means for sequentially engaging sheet material articles at the lower end portion of the stack of sheet material in said hopper means and for sequentially feeding the sheet material articles upwardly away from the lower end portion of the stack of sheet material in said hopper means when the lower end portion of said hopper means is adjacent to the upper end portion of said ramp means.

58. An apparatus as set forth in claim 53 wherein said hopper means includes a rectangular array of panels having inner side surfaces which are disposed adjacent to sides of a stack of sheet material in said hopper means, said rectangular array of panels and the stack of sheet material in said hopper means being disposed in an upright orientation when the open lower end portion of said hopper means is adjacent to the lower end portion of said ramp means, said rectangular array of panels and the stack of sheet material in said hopper means being disposed in a tilted orientation when the open lower end portion of said hopper means is adjacent to the upper end portion of said ramp means, said rectangular array of panels at least partially supporting the stack of sheet material in said hopper means when said hopper means is in the tilted orientation.

59. An apparatus as set forth in claim 58 further including presser means mounted on said hopper means for applying a downwardly directed force against an upper end portion of the stack of sheet material in said hopper means when the lower end portion of the stack of sheet material in said hopper means engaged said sheet material feed means and said hopper means is in the tilted orientation.

60. An apparatus as set forth in claim 53 wherein said motor means is operable to tilt said hopper means from an upright orientation in which a central axis of said hopper means is vertical to a tilted orientation in which the central axis of said hopper means is skewed at an acute angle to a vertical axis during movement of the lower end portion of said hopper means upwardly along said ramp means.

61. An apparatus as set forth in claim 60 wherein the stack of sheet material in said hopper means is at least partially supported by said hopper means when said hopper means is in the tilted orientation.

62. An apparatus as set forth in claim 60 wherein said means for lifting a stack of sheet material upwardly includes second motor means for moving said ramp means from a lowered position to a raised position to lift a stack of sheet material upwardly through the open lower end portion of said hopper means when said hopper means is in the upright orientation.

63. An apparatus comprising a hopper having an open lower end portion, means for supporting said hopper for tilting movement between an upright orientation in which a central axis of said hopper is vertical and a tilted orientation in which the central axis of said hopper is skewed at an acute angle to a vertical axis, a lift member having surface means for engaging a lower end portion of a stack of sheet material disposed beneath said hopper, lift motor means for moving said lift member upwardly from a lowered position to a raised position to move the stack of sheet material through the open lower end portion of said hopper when said hopper is in the upright orientation, hopper motor means for tilting said hopper from the upright orientation to the tilted orientation with a stack of sheet material in said hopper, and sheet material feed means for sequentially feeding sheet material from the stack of sheet material in said hopper while said hopper is in the tilted orientation, said sheet material feed means being operable to sequentially feed sheet material upwardly away from the open lower end portion of said hopper when said hopper is in the tilted orientation.

64. An apparatus as set forth in claim 63 wherein the stack of sheet material in said hopper is at least partially supported by said hopper and by said sheet material feed means when said hopper is in the tilted orientation.

65. An apparatus as set forth in claim 63 wherein said hopper motor means is operable to move said hopper and a stack of sheet material in said hopper relative to said lift member during movement of said hopper between the upright and tilted orientations.

66. An apparatus as set forth in claim 63 wherein said lift member includes surface means for defining an upwardly inclined ramp, said hopper motor means being operable to move the lower end portion of the stack of sheet material in said hopper along the upwardly inclined ramp into engagement with said sheet material feed means as said hopper motor means tilts said hopper from the upright orientation toward the tilted orientation.

67. An apparatus as set forth in claim 63 wherein said lift member is disposed in engagement with a lower end portion of the stack of sheet material in said hopper to hold the stack of sheet material in said hopper during tilting of said hopper from the upright orientation toward the tilted orientation.

68. An apparatus as set forth in claim 63 further including upwardly inclined ramp means for engaging the lower end portion of the stack of sheet material in said hopper during movement of said hopper from the upright orientation to the tilted orientation.

69. An apparatus as set forth in claim 63 further including carriage means for supporting a container having a plurality of compartments for holding stacks of sheet material, said carriage means being operable to rotate the container about a vertical axis from a first orientation in which a first compartment of the container is adjacent to said lift member to a second orientation in which a second compartment of the container is adjacent to said lift member, said lift member being engageable with a stack of sheet material in the first compartment when the container is in the first orientation and being engageable with a stack of sheet material in the second compartment when the container is in the second orientation.

70. An apparatus as set forth in claim 69 further including first shuttle means operable from a retracted condition to an extended condition to move the container from a position offset to a first side of said carriage means to a position in which the container is disposed over said carriage means, and second shuttle means operable from an extended condition to a retracted condition to move the container from a position disposed over said carriage means to a position offset to a second side of said carriage means.

71. An apparatus comprising a hopper having an open lower end portion, means for supporting said hopper for tilting movement between an upright orientation in which a central axis of said hopper is vertical and a tilted orientation in which the central axis of said hopper is skewed at an acute angle to a vertical axis, a lift member having surface means for engaging a lower end portion of a stack of sheet material disposed beneath said hopper, said lift member including surface means for defining an upwardly inclined ramp, lift motor means for moving said lift member upwardly from a lowered position to a raised position to move the stack of sheet material through the open lower end portion of said hopper when said hopper is in the upright orientation, hopper motor means for tilting said hopper from the upright orientation to the tilted orientation with a stack of sheet material in said hopper, and sheet material feed means for sequentially feeding sheet material from the stack of sheet material in said hopper while said hopper is in the tilted orientation, said hopper motor means being operable to move the lower end portion of the stack of sheet material in said hopper along the upwardly inclined ramp into engagement with said sheet material feed means as said hopper motor means tilts said hopper from the upright orientation toward the tilted orientation.

72. An apparatus as set forth in claim 71 wherein the stack of sheet material in said hopper is at least partially supported by said hopper and by said sheet material feed means when said hopper is in the tilted orientation.

73. An apparatus as set forth in claim 72 further including carriage means for supporting a container having a plurality of compartments for holding stacks of sheet material, said carriage means being operable to rotate the container about a vertical axis from a first orientation in which a first compartment of the container is adjacent to said lift member to a second orientation in which a second compartment of the container is adjacent to said lift member, said lift member being engageable with a stack of sheet material in the first compartment when the container is in the first orientation and being engageable with a stack of sheet material in the second compartment when the container is in the second orientation.

74. An apparatus as set forth in claim 73 further including first shuttle means operable from a retracted condition to an extended condition to move the container from a position offset to a first side of said carriage means to a position in which the container is disposed over said carriage means, and second shuttle means operable from an extended condition to a retracted condition to move the container from a position disposed over said carriage means to a position offset to a second side of said carriage means.

75. An apparatus comprising a hopper having an open lower end portion, means for supporting said hopper for tilting movement between an upright orientation in which a central axis of said hopper is vertical and a tilted orientation in which the central axis of said hopper is skewed at an acute angle to a vertical axis, a lift member having surface means for engaging a lower end portion of a stack of sheet material disposed beneath said hopper, lift motor means for moving said lift member upwardly from a lowered position to a raised position to move the stack of sheet material through the open lower end portion of said hopper when said hopper is in the upright orientation, hopper motor means for tilting said hopper from the upright orientation to the tilted orientation with a stack of sheet material in said hopper, upwardly inclined ramp means for engaging the lower end portion of the stack of sheet material in said hopper during movement of said hopper from the upright orientation to the tilted orientation, and sheet material feed means for sequentially feeding sheet material from the stack of sheet material in said hopper while said hopper is in the tilted orientation.

76. An apparatus as set forth in claim 75 further including carriage means for supporting a container having a plurality of compartments for holding stacks of sheet material, said carriage means being operable to rotate the container about a vertical axis from a first orientation in which a first compartment of the container is adjacent to said lift member to a second orientation in which a second compartment of the container is adjacent to said lift member, said lift member being engageable with a stack of sheet material in the first compartment when the container is in the first orientation and being engageable with a stack of sheet material in the second compartment when the container is in the second orientation.

77. An apparatus as set forth in claim 76 further including first shuttle means operable from a retracted condition to an extended condition to move the container from a position offset to a first side of said carriage means to a position in which the container is disposed over said carriage means, and second shuttle means operable from an extended condition to a retracted condition to move the container from a position disposed over said carriage means to a position offset to a second side of said carriage means.

78. A sheet material handling apparatus for removing stacks of sheet material from a plurality of compartments in each of a plurality of containers, said apparatus comprising unloader means for moving sequentially moving stacks of sheet material upwardly through open upper ends of compartments of each of the containers in turn when the containers are disposed at an unloading position, carriage means for supporting each of the containers in turn at the unloading position, said carriage means including a container support section, first drive means for moving said container support section along a first path in a direction away from said unloader means to an indexing position after a first stack of sheet material has been removed from a first compartment of a container by said unloader means, and second drive means for rotating said container support section about a vertical axis at the indexing position to change the orientation of the container relative to said unloader means from a first orientation to a second orientation, said first drive means being operable to move said container support section along the first path from the indexing position in a direction toward said unloader means with the container in the second orientation to move the container to the unloading position with the container in the second orientation, said unloader means being operable to move a second stack of sheet material upwardly through an open upper end of a second compartment of the container when the container is at the unloading position in the second orientation, first shuttle means disposed adjacent to a first side of said carriage means and movable along a second path which extends transversely to the first path to sequentially transfer containers having compartments containing stacks of sheet material to said carriage means, and second shuttle means disposed adjacent to a second side of said carriage means and movable along the second path to sequentially transfer containers having empty compartments from said carriage means, said unloader means including a hopper which is disposed above a container at the unloading position and which has an open lower end portion, lift means for lifting a stack of sheet material upwardly from a compartment of a container at the unloading position through the open lower end portion of said hopper to move the stack of sheet material into said hopper, feed means for sequentially feeding sheets of material from a lower end portion of the stack of sheet material in said hopper, means for tilting said hopper and a stack of sheet material from an upright orientation in which a central axis of said hopper is vertical and coincident with a central axis of the compartment of the container from which the stack of sheet material was removed to a tilted orientation in which the central axis of said hopper is skewed at an acute angle to the central axis of the compartment of the container from which the stack of sheet material was removed, said feed means being operable to feed sheet material from the stack of sheet material when said hopper and the stack of sheet material are in the tilted orientation.

79. An apparatus as set forth in claim 78 wherein said unloader means includes surface means for defining an upwardly inclined ramp, said hopper tilting means being operable to move the lower end portion of the stack of sheet material in said hopper along said upwardly inclined ramp as said hopper tilting means tilts said hopper from the upright orientation toward the tilted orientation.

80. A sheet material handling apparatus for removing stacks of sheet material from a plurality of compartments in each of a plurality of containers, said apparatus comprising unloader means for moving sequentially moving stacks of sheet material upwardly through open upper ends of compartments of each of the containers in turn when the containers are disposed at an unloading position, carriage means for supporting each of the containers in turn at the unloading position, said carriage means including a container support section, first drive means for moving said container support section along a first path in a direction away from said unloader means to an indexing position after a first stack of sheet material has been removed from a first compartment of a container by said unloader means, and second drive means for rotating said container support section about a vertical axis at the indexing position to change the orientation of the container relative to said unloader means from a first orientation to a second orientation, said first drive means being operable to move said container support section along the first path from the indexing position in a direction toward said unloader means with the container in the second orientation to move the container to the unloading position with the container in the second orientation, said unloader means being operable to move a second stack of sheet material upwardly through an open upper end of a second compartment of the container when the container is at the unloading position in the second orientation, first shuttle means disposed adjacent to a first side of said carriage means and movable along a second path which extends transversely to the first path to sequentially transfer containers having compartments containing stacks of sheet material to said carriage means, and second shuttle means disposed adjacent to a second side of said carriage means and movable along the second path to sequentially transfer containers having empty compartments from said carriage means, said unloader means including a hopper having an open lower end portion, said hopper being disposed above a container at the unloading position, lift means for engaging the lower end portion of a stack of sheet material disposed in a compartment of a container at the unloading position and for moving the stack of sheet material upwardly from the container and into said hopper through the open end portion of said hopper, surface means for defining an upwardly inclined ramp, sheet material feed means disposed adjacent to an upper end portion of said ramp for sequentially feeding sheet material from the open lower end portion of said hopper, and means for moving the open lower end portion of said hopper upwardly along said ramp toward a position in which the lower end portion of a stack of sheet material in said hopper engages said sheet material feed means.

81. A method of handling sheet material, said method comprising the steps of moving a stack of sheet material into a hopper which is disposed in an upright orientation, maintaining the stack of sheet material in an upright orientation during movement of the stack of sheet material into the hopper, moving the stack of sheet material from an upright orientation to a tilted orientation by moving the hopper from its upright orientation to a tilted orientation with the stack of sheet material in the hopper, said step of moving the stack of sheet material from an upright orientation to a tilted orientation includes moving a lower end portion of the stack of sheet material upwardly along an inclined ramp, and feeding sheet material from a lower end portion of the stack of sheet material while the stack of sheet material is in the hopper and while the hopper and stack of sheet material are in their tilted orientations.

82. A method as set forth in claim 81 wherein said step of moving a stack of sheet material into a hopper which is disposed in an upright orientation includes moving the stack of sheet material upwardly through an open lower end portion of the hopper.

83. A method as set forth in claim 81 wherein said step of moving a lower end portion of the stack of sheet material upwardly along an inclined ramp includes moving the lower end portion of the stack of sheet material into engagement with a sheet material feed apparatus during movement of the lower end portion of the stack of sheet material along the ramp.

84. A method as set forth in claim 81 wherein said step of moving the hopper from its upright orientation to a tilted orientation includes moving a side wall of the hopper from an upright orientation to a tilted orientation in which the side wall of the hopper is skewed at an acute angle to a vertical plane, said step of feeding sheet material from a lower end portion of the stack of sheet material includes at least partially supporting the stack of sheet material with the side wall of the hopper.

85. A method as set forth in claim 81 wherein said step of moving a stack of sheet material into a hopper includes moving a first stack of sheet material from a first compartment of a container into the hopper, said method further including the steps of rotating the container relative to the hopper about a vertical axis to change the orientation of the container relative to the hopper after having performed said step of moving a first stack of sheet material from a first compartment of the container into the hopper, thereafter, moving a second stack of sheet material from a second compartment of the container into the hopper with the hopper disposed in an upright orientation, maintaining the second stack of sheet material in an upright orientation during movement of the second stack of sheet material from the second compartment of the container into the hopper, moving the second stack of sheet material from an upright orientation to a tilted orientation by moving the hopper from its upright orientation to its tilted orientation, and feeding sheet material from a lower end portion of the second stack of sheet material while the second stack of sheet material is in the hopper and while the hopper and the second stack of sheet material are in their tilted orientations.

86. A sheet material handling apparatus for removing a stack of sheet material from a container and feeding sheet material from the stack of sheet material, said apparatus comprising a hopper having an open lower end portion, lift means for lifting the stack of sheet material upwardly from the container through the open lower end portion of said hopper to move the stack of sheet material into said hopper, said lift means being operable to lift the stack of sheet material upwardly through the open lower end portion of said hopper when an upper end portion of the stack of sheet material leading and a lower end portion of the stack of sheet material trailing behind the upper end portion of the stack of sheet material, feed means for sequentially feeding sheets of material from the lower end portion of the stack of sheet material in said hopper, and hopper tilting means for moving said hopper from an upright orientation to a tilted orientation in which a central axis of said hopper is skewed at an acute angle to a vertical axis, said lift means being operable to lift the stack of sheet material upwardly through the open lower end portion of said hopper when said hopper is in the upright orientation, said feed means being operable to feed sheet material from the lower end portion of the stack of sheet material in said hopper when said hopper is in the tilted orientation.

87. An apparatus as set forth in claim 86 wherein said feed means includes means for at least partially supporting the stack of sheet material when said hopper is in the tilted orientation, said lift means including a lift member and means for moving said lift member from a lowered position to a raised position during lifting of the stack of sheet material upwardly from the container and for moving said lift member from a raised position to a lowered position while the stack of sheet material is at least partially supported by said feed means.

88. A sheet material handling apparatus as set forth in claim 86 wherein the container has a plurality of compartments with open upper end portions, said apparatus further including carriage means for supporting the container at an unloading position with an open upper end portion of a first container compartment beneath said hopper, said lift means being operable to lift a first stack of sheet material upwardly through the open upper end portion of the first container compartment and through the open lower end portion of said hopper to position the first stack of sheet material in said hopper, said carriage means including a container support section, first drive means for moving said container support section along a first path in a direction away from the unloading position to an indexing position, and second drive means for rotating said container support section about a vertical axis at the indexing position to change the orientation of the container relative to said hopper from a first orientation to a second orientation by moving the first container compartment away from said hopper and moving a second container compartment toward said hopper, said first drive means being operable to move said container support section along the first path from the indexing position with the container in the second orientation to move the container to the unloading position and to move the second container compartment beneath said hopper, said lift means being operable to lift a second stack of sheet material upwardly through the open upper end portion of the second container compartment and through the open lower end portion of said hopper to position the second stack of sheet material in said hopper when the container is in the second orientation at the unloading position.

89. An apparatus as set forth in claim 88 further including first shuttle means movable along a second path which extends transversely to the first path to move the container from a position offset to one side of said carriage means to said carriage means, and second shuttle means being movable along the second path to move the container from said carriage means to a position offset to one side of said carriage means.

90. An apparatus as set forth in claim 86 further including first shuttle means operable from a retracted condition to an extended condition to move the container from a position offset to a first side of said hopper to an unloading position in which the container is disposed beneath the hopper, and second shuttle means operable from an extended condition to a retracted condition to move the container from the unloading position to a position offset to a second side of said hopper.

91. An apparatus as set forth in claim 86 wherein the container has a plurality of compartments with open upper end portions, said apparatus further including carriage means for supporting the container with a first container compartment beneath said hopper, for rotating the container about a vertical axis to move the first container compartment away from said hopper and to move a second container compartment toward said hopper, and for supporting the container with the second container compartment beneath said hopper, said lift means being operable to lift a first stack of sheet material upwardly through the open upper end portion of the first container compartment and into said hopper while the container is supported by said carriage means with the first container compartment beneath said hopper, said lift means being operable to lift a second stack of sheet material upwardly through the open upper end portion of the second container compartment and into said hopper while the container is supported by said carriage means with the second container compartment beneath said hopper.

92. A sheet material handling apparatus for sequentially removing stacks of sheet material from a container having a plurality of compartments with open upper end portions and feeding sheet material from each of the stacks of sheet material in turn, said apparatus comprising a hopper having an open lower end portion, lift means for sequentially lifting the stacks of sheet material upwardly from the container along a linear path through the open lower end portion of said hopper to move each stack of sheet material in turn upwardly into said hopper, feed means for sequentially feeding sheets of material from a lower end portion of each stack of sheet material in turn while the stack of sheet material is in said hopper, and carriage means for supporting the container with a first container compartment beneath said hopper, for rotating the container about a vertical axis to move the first container compartment away from said hopper and to move a second container compartment toward said hopper, and for supporting the container with the second container compartment beneath said hopper, said lift means being operable to lift a first stack of sheet material upwardly along the linear path through the open upper end portion of the first container compartment and through the open lower end portion of said hopper while the container is supported by said carriage means with the first container compartment beneath said hopper, said lift means being operable to lift a second stack of sheet material upwardly along the linear path through the open upper end portion of the second container compartment and through the open lower end portion of said hopper while the container is supported by said carriage means with the second container compartment beneath said hopper.

93. An apparatus comprising a hopper having an open lower end portion, means for supporting said hopper for tilting movement between an upright orientation in which a central axis of said hopper is vertical and a tilted orientation in which the central axis of said hopper is skewed at an acute angle to a vertical axis, a lift member having surface means for engaging a lower end portion of a stack of sheet material disposed beneath said hopper, lift motor means for moving said lift member upwardly along a vertical path from a lowered position to a raised position to move the stack of sheet material upwardly through the open lower end portion of said hopper when said hopper is in the upright orientation, hopper motor means for tilting said hopper from the upright orientation to the tilted orientation with a stack of sheet material in said hopper, and sheet material feed means for sequentially feeding sheet material from the stack of sheet material in said hopper while said hopper is in the tilted orientation.

94. An apparatus as set forth in claim 93 wherein said lift member is disposed in engagement with a lower end portion of the stack of sheet material in said hopper to hold the stack of sheet material in said hopper during tilting of said hopper from the upright orientation toward the tilted orientation.

95. An apparatus as set forth in claim 93 further including carriage means for supporting a container having a plurality of compartments for holding stacks of sheet material, said carriage means being operable to rotate the container about a vertical axis from a first orientation in which a first compartment of the container is adjacent to said lift member to a second orientation in which a second compartment of the container is adjacent to said lift member, said lift member being engageable with a stack of sheet material in the first compartment when the container is in the first orientation and being engageable with a stack of sheet material in the second compartment when the container is in the second orientation.

96. An apparatus as set forth in claim 95 further including first shuttle means operable from a retracted condition to an extended condition to move the container from a position offset to a first side of said carriage means to a position in which the container is disposed over said carriage means, and second shuttle means operable from an extended condition to a retracted condition to move the container from a position disposed over said carriage means to a position offset to a second side of said carriage means.

97. An apparatus as set forth in claim 93 wherein said sheet material feed means is operable to sequentially feed sheet material through the open lower end portion of said hopper when said hopper is in the tilted orientation.

98. An apparatus as set forth in claim 93 wherein the stack of sheet material in said hopper is at least partially supported by said hopper and by said sheet material feed means when said hopper is in the tilted orientation, said lift motor means being operable to move said lift member downwardly along the vertical linear path from the raised position to the lowered position while said hopper is in the tilted orientation.

99. A method of handling sheet material, said method comprising the steps of moving a stack of sheet material upwardly along a linear path into a hopper which is disposed in an upright orientation, said step of moving the stack of sheet material upwardly along the linear path includes moving the stack of sheet material through an open lower end portion of the hopper, maintaining the stack of sheet material in an upright orientation during upward movement of the stack of sheet material along the linear path into the hopper, moving the stack of sheet material from an upright orientation to a tilted orientation by moving the hopper from its upright orientation to a tilted orientation with the stack of sheet material in the hopper, and feeding sheet material from a lower end portion of the stack of sheet material while the stack of sheet material is in the hopper and while the hopper and stack of sheet material are in their tilted orientations.

100. A method as set forth in claim 99 wherein said step of moving the stack of sheet material from an upright orientation to a tilted orientation includes moving the lower end portion of the stack of sheet material into engagement with a sheet material feed apparatus.

101. A method as set forth in claim 99 wherein said step of moving the hopper from its upright orientation to a tilted orientation includes moving a side wall of the hopper from an upright orientation to a tilted orientation in which the side wall of the hopper is skewed at an acute angle to a vertical plane, said step of feeding sheet material from a lower end portion of the stack of sheet material includes at least partially supporting the stack of sheet material with the side wall of the hopper.

102. A method as set forth in claim 99 wherein said step of moving a stack of sheet material into a hopper includes moving a first stack of sheet material upwardly along the linear path from a first compartment of a container into the hopper, said method further including the steps of rotating the container relative to the hopper about a vertical axis to change the orientation of the container relative to the hopper after having performed said step of moving a first stack of sheet material from a first compartment of the container into the hopper, thereafter, moving a second stack of sheet material upwardly along the linear path from a second compartment of the container into the hopper with the hopper disposed in an upright orientation, maintaining the second stack of sheet material in an upright orientation during movement of the second stack of sheet material upwardly along the linear path from the second compartment of the container into the hopper, moving the second stack of sheet material from an upright orientation to a tilted orientation by moving the hopper from its upright orientation to its tilted orientation, and feeding sheet material from a lower end portion of the second stack of sheet material while the second stack of sheet material is in the hopper and while the hopper and the second stack of sheet material are in their tilted orientations.

103. A method of removing stacks of sheet material from a container having a plurality of compartments for holding stacks of sheet material, said method comprising the steps of positioning the container in a first orientation with a first compartment of the container beneath a hopper having an open lower end portion, said step of positioning the container in a first orientation including positioning the container with a central axis of the first compartment vertically aligned with a central axis of said hopper, moving a first stack of sheet material vertically upwardly from the first compartment of the container into the hopper through the open lower end portion of the hopper while the container is in the first orientation, feeding the sheet material forming the first stack of sheet material from the hopper, positioning the container in a second orientation with a second compartment of the container beneath the hopper, said step of positioning the container in a second orientation includes the step of rotating the container about a vertical axis and positioning the container with a central axis of the second compartment vertically aligned with the central axis of the hopper, thereafter, moving a second stack of sheet material vertically upwardly from the second compartment of the container into the hopper through the open lower end portion of the hopper while the container is in the second orientation, and feeding the sheet material forming the second stack of sheet material from the hopper.

104. A method as set forth in claim 103 further including the step of moving the first stack of sheet material from an upright orientation to a tilted orientation by tilting the hopper from an upright orientation to a tilted orientation prior to performing said step of feeding the sheet material forming the first stack of sheet material from the hopper, said step of feeding the sheet material forming the first stack of sheet material including feeding sheet material from the open lower end portion of the hopper with the first stack of sheet material in the tilted orientation, said method further including the step of moving the second stack of sheet material from an upright orientation to a tilted orientation by tilting the hopper from the upright orientation to the tilted orientation prior to performing said step of feeding the sheet material forming the second stack of sheet material from the hopper, said step of feeding the sheet material forming the second stack of sheet material including feeding sheet material from the open lower end portion of the hopper with the second stack of sheet material in the tilted orientation.

* * * * *

UNITED STATES PATENT AND TRADEMARK OFFICE
CERTIFICATE OF CORRECTION

PATENT NO. : 5,171,125
DATED : December 15, 1992
INVENTOR(S) : Stephen R. Kleinhen It is certified that error appears in the above-identified patent and that said Letters Patent is hereby corrected as shown below:

Column 29, Line 24, Claim 21, Change "ram" to --ramp--.

Column 29, Line 42, Claim 22, Delete "from the".

Column 31, Line 38, Claim 33, Change "engaged" to --engages--.

Column 35, Line 36, Claim 53, Change "from containers" to --from a container--.

Column 36, Line 39, Claim 59, Change "engaged" to --engages--.

Column 42, Line 22, Claim 86, Change "when" to --with--.

Signed and Sealed this

Ninth Day of November, 1993

Attest:

BRUCE LEHMAN

*Attesting Officer*  *Commissioner of Patents and Trademarks*